United States Patent
Maruyama et al.

(10) Patent No.: US 10,113,115 B2
(45) Date of Patent: *Oct. 30, 2018

(54) NEMATIC LIQUID CRYSTAL COMPOSITION AND LIQUID CRYSTAL DISPLAY DEVICE USING THE SAME

(71) Applicant: DIC Corporation, Tokyo (JP)

(72) Inventors: Kazunori Maruyama, Kita-adachi-gun (JP); Shinichi Hirata, Kita-adachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/504,416

(22) PCT Filed: Sep. 1, 2015

(86) PCT No.: PCT/JP2015/074835
§ 371 (c)(1),
(2) Date: Feb. 16, 2017

(87) PCT Pub. No.: WO2016/035786
PCT Pub. Date: Mar. 10, 2016

(65) Prior Publication Data
US 2017/0253800 A1    Sep. 7, 2017

(30) Foreign Application Priority Data

Sep. 5, 2014 (JP) ................. 2014-181213

(51) Int. Cl.
*C09K 19/34* (2006.01)
*C09K 19/30* (2006.01)
*C09K 19/54* (2006.01)
*G02F 1/1362* (2006.01)

(52) U.S. Cl.
CPC ...... *C09K 19/3402* (2013.01); *C09K 19/3003* (2013.01); *C09K 19/3066* (2013.01); *C09K 19/542* (2013.01); *G02F 1/1362* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01); *C09K 2019/548* (2013.01)

(58) Field of Classification Search
CPC ............ C09K 19/3402; C09K 19/3066; C09K 19/3003; C09K 19/542; C09K 2019/3004; C09K 2019/3009; C09K 2019/301; C09K 2019/3016; C09K 2019/3422; C09K 2019/548; G02F 1/1333; G02F 1/1362
USPC .................................................. 252/299.66
See application file for complete search history.

(56) References Cited

U.S. PATENT DOCUMENTS

| 5,384,065 | A | 1/1995 | Geelhaar et al. |
|---|---|---|---|
| 5,599,480 | A | 2/1997 | Tarumi et al. |
| 5,653,911 | A | 8/1997 | Kondo et al. |
| 5,720,899 | A | 2/1998 | Kondo et al. |
| 9,045,684 | B2 | 6/2015 | Gotoh et al. |
| 9,725,651 | B2 * | 8/2017 | Hirata ............... G02F 1/133711 |
| 2009/0103011 | A1 | 4/2009 | Bernatz et al. |
| 2011/0155953 | A1 | 6/2011 | Hattori et al. |
| 2012/0092608 | A1 | 4/2012 | Ito et al. |
| 2012/0161072 | A1 | 6/2012 | Saito et al. |
| 2012/0181478 | A1 | 7/2012 | Hattori et al. |
| 2012/0229744 | A1 | 9/2012 | Hattori et al. |
| 2012/0261614 | A1 | 10/2012 | Goto et al. |
| 2012/0292568 | A1 | 11/2012 | Kuriyama et al. |
| 2013/0114010 | A1 | 5/2013 | Goetz et al. |
| 2013/0277609 | A1 | 10/2013 | Goto et al. |
| 2014/0010973 | A1 | 1/2014 | Gotoh et al. |
| 2014/0027671 | A1 | 1/2014 | Gotoh et al. |
| 2014/0028964 | A1 | 1/2014 | Klasen-Memmer et al. |
| 2014/0043579 | A1 | 2/2014 | Furusato et al. |
| 2014/0085591 | A1 | 3/2014 | Feng et al. |
| 2014/0183409 | A1 | 7/2014 | Gotoh et al. |
| 2016/0009999 | A1 * | 1/2016 | Hirata .................... C09K 19/54 252/299.63 |
| 2016/0274418 | A1 | 9/2016 | Schadt et al. |
| 2016/0289565 | A1 | 10/2016 | Sudo et al. |
| 2016/0319191 | A1 | 11/2016 | Grata et al. |

FOREIGN PATENT DOCUMENTS

CN       102876338 A      1/2013
EP       0 474 062 A2     3/1992
(Continued)

OTHER PUBLICATIONS

International Search Report dated Nov. 2, 2015, issued in counterpart International Application No. PCT/JP2015/074835 (3 pages).
(Continued)

*Primary Examiner* — Geraldina Visconti
(74) *Attorney, Agent, or Firm* — Westerman, Hattori, Daniels & Adrian, LLP

(57) ABSTRACT

There is provided a liquid crystal composition having the following properties without suffering reductions in refractive index anisotropy (Δn) and nematic phase-isotropic liquid phase transition temperature ($T_{ni}$): sufficiently low viscosity (η), sufficiently low rotational viscosity (γ1), a large elastic constant ($K_{33}$), and a negative dielectric anisotropy (Δε) with a large absolute value. There is also provided a liquid crystal display device of, for example, a VA type that uses such a liquid crystal composition and that has a high response speed and excellent display quality with defective display being eliminated or reduced. In particular, a liquid crystal composition having a negative dielectric anisotropy is provided, the composition containing a first component that is at least one compound represented by General Formula (i) and a second component that is at least one compound selected from compounds represented by General Formula (L).

8 Claims, No Drawings

(56) References Cited

FOREIGN PATENT DOCUMENTS

| | | |
|---|---|---|
| EP | 2522649 A1 | 11/2012 |
| JP | 1-240591 A | 9/1989 |
| JP | 1-247482 A | 10/1989 |
| JP | 2-22382 A | 1/1990 |
| JP | 8-12605 A | 1/1996 |
| JP | 8-104869 A | 4/1996 |
| JP | 2002-145830 A | 5/2002 |
| JP | 2003-307720 A | 10/2003 |
| JP | 2005-272562 A | 10/2005 |
| JP | 2006-37054 A | 2/2006 |
| JP | 2006-301643 A | 11/2006 |
| JP | 2007-002132 A | 1/2007 |
| JP | 2008-116931 A | 5/2008 |
| JP | 2009-504814 A | 2/2009 |
| JP | 2011-213787 A | 10/2011 |
| JP | 2012-018215 A | 1/2012 |
| JP | 2012-077200 A | 4/2012 |
| JP | 2012-087165 A | 5/2012 |
| JP | 2012-97222 A | 5/2012 |
| JP | 2012-136623 A | 7/2012 |
| JP | 2012-240945 A | 12/2012 |
| JP | 2012-241124 A | 12/2012 |
| JP | 2013-503952 A | 2/2013 |
| JP | 2013-180974 A | 9/2013 |
| JP | 5333685 B2 | 11/2013 |
| JP | 2014-43561 A | 3/2014 |
| JP | 2014-141648 A | 8/2014 |
| JP | 2015-157915 A | 9/2015 |
| WO | 2010/084823 A1 | 7/2010 |
| WO | 2010/131600 A1 | 11/2010 |
| WO | 2011/055643 A1 | 5/2011 |
| WO | 2012/022391 A2 | 2/2012 |
| WO | 2012-086504 A1 | 6/2012 |
| WO | 2012/130380 A1 | 10/2012 |
| WO | 2012/137810 A1 | 10/2012 |
| WO | 2013/161576 A1 | 10/2013 |
| WO | 2014/024648 A1 | 2/2014 |

OTHER PUBLICATIONS

International Search Report dated Jun. 7, 2014, issued in PCT/JP2014/057279.
Non-Final Office Action dated Aug. 1, 2016, issued in U.S. Appl. No. 14/778,775.
Final Office Action dated Nov. 28, 2016, issued in U.S. Appl. No. 14/778,775.
Notice of Allowance dated Apr. 4, 2017, issued in U.S. Appl. No. 14/778,775.
International Search Report dated May 27, 2014, issued in PCT/JP2014/055460.
Non-Final Office Action dated Apr. 5, 2016, issued in U.S. Appl. No. 14/771,954.
Final Office Action dated Nov. 4, 2016, issued in U.S. Appl. No. 14/771,954.
Non-Final Office Action dated Nov. 3, 2017, issued in U.S. Appl. No. 14/771,954.
Final Office Action dated May 29, 2018, issued in U.S. Appl. No. 14/171,954.

* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition which is useful as a material for a liquid crystal display and which has a negative dielectric anisotropy (Δε), and the present invention also relates to a liquid crystal display device using such a nematic liquid crystal composition.

BACKGROUND ART

Liquid crystal display devices are applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest-host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. Examples of a drive system include static driving, multiplex driving, a passive matrix, and an active matrix (AM) in which, for example, a TFT (thin film transistor) or a TFD (thin film diode) is used for driving.

Among these types of liquid crystal display devices, an IPS type, an ECB type, a VA type, and a CSH type are characterized in that a liquid crystal material having a negative Δε is used. In particular, VA display devices of AM driving are applied to display devices that need to quickly respond and to have a wide viewing angle, such as television sets.

Nematic liquid crystal compositions used in, for instance, VA display devices need to enable driving at low voltage, a quick response, and a broad range of operating temperature. In other words, a liquid crystal composition having a negative Δε with a large absolute value, low viscosity, and a high nematic phase-isotropic liquid phase transition temperature ($T_{ni}$) has been demanded. In order to control Δn×d that is the product of refractive index anisotropy (Δn) and a cell gap (d) to be a predetermined value, the Δn of a liquid crystal material needs to be adjusted to be in a proper range on the basis of the cell gap. In addition, a quick response is important in liquid crystal display devices applied to television sets or other apparatuses, which generates a need for a liquid crystal material having a low viscosity (η).

A variety of compounds having a negative Δε with a large absolute value have been studied to improve the properties of liquid crystal compositions.

A liquid crystal composition containing the following liquid crystal compounds (A) and (B) each having a 2,3-difluorophenylene structure has been disclosed as a liquid crystal material having a negative Δε (see Patent Literature 1).

[Chem. 1]

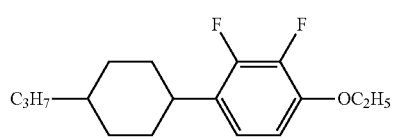

(A)

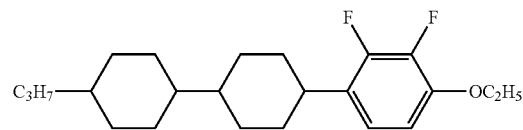

This liquid crystal composition also contains liquid crystal compounds (C) and (D) as compounds having a Δε of substantially zero; however, the response speed of the liquid crystal composition is below the standards necessary for applications such as liquid crystal television sets.

[Chem. 2]

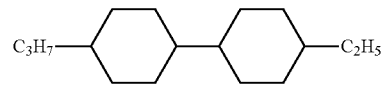

(C)

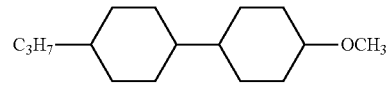

(D)

A liquid crystal composition containing a compound represented by Formula (E) has been disclosed; however, this composition is a liquid crystal composition in which the liquid crystal compound (D) is used in combination and which has a small Δn (see Patent Literature 2) or a liquid crystal composition which contains a compound of which the molecules each contain an alkenyl group (alkenyl compound), such as a liquid crystal compound (F), to improve response speed (see Patent Literature 3). Further study has been necessary in order to give both high Δn and high reliability.

[Chem. 3]

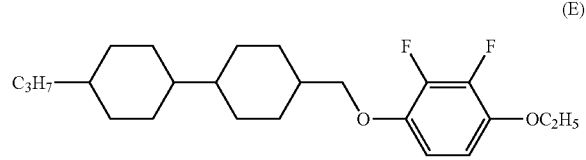

(E)

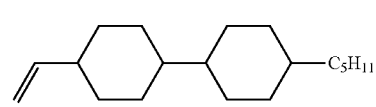

(F)

From such viewpoints, a liquid crystal composition which enables a quick response speed that is necessary in applications such as liquid crystal television sets needs to have the following properties without suffering reductions in refractive index anisotropy (Δn) and nematic phase-isotropic liquid phase transition temperature ($T_{ni}$): sufficiently low viscosity (η), sufficiently low rotational viscosity (γ1), and a large elastic constant ($K_{33}$).

CITATION LIST

Patent Literature

PTL 1: Japanese Unexamined Patent Application Publication No. 8-104869

PTL 2: European Patent Application Publication No. 0474062

PTL 3: Japanese Unexamined Patent Application Publication No. 2006-37054

SUMMARY OF INVENTION

Technical Problem

It is an object of the present invention to provide a liquid crystal composition having the following properties without suffering reductions in refractive index anisotropy (Δn) and nematic phase-isotropic liquid phase transition temperature ($T_{ni}$): sufficiently low viscosity (η), sufficiently low rotational viscosity (γ1), a large elastic constant ($K_{33}$), and a negative dielectric anisotropy (Δε) with a large absolute value. It is another object of the present invention to provide a liquid crystal display device of, for example, a VA type that uses such a liquid crystal composition and that has a high response speed, excellent heat resistance, and excellent display quality with defective display being eliminated or reduced.

Solution to Problem

The inventors have studied a variety of compounds and found that a combination of specific compounds enables the above-mentioned objects to be achieved, thereby accomplishing the present invention.

The present invention provides a liquid crystal composition containing a first component that is at least one compound represented by General Formula (i)

[Chem. 4]

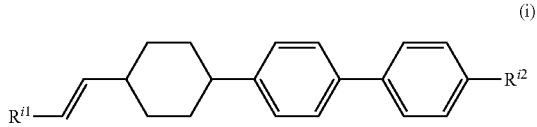

(i)

(in the formula, $R^{i1}$ represents an alkyl group having 1 to 8 carbon atoms, and $R^{i2}$ represents an alkyl group having 3 to 8 carbon atoms) and
a second component that is at least one compound selected from compounds represented by General Formula (L)

[Chem. 5]

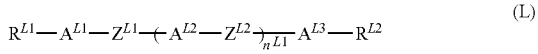

(L)

(in the formula, $R^{L1}$ and $R^{L2}$ each independently represent an alkyl group having 1 to 8 carbon atoms; in the alkyl group, one —CH$_2$— or at least two —CH$_2$—'s not adjoining each other are each independently optionally substituted with —CH=CH—, —C≡C—, —O—, —CO—, —COO—, or —OCO—;

$n^{L1}$ represents 0, 1, 2, or 3;

$A^{L1}$, $A^{L2}$, and $A^{L3}$ each independently represent a group selected from the group consisting of
(a) a 1,4-cyclohexylene group (in which one —CH$_2$— or at least two —CH$_2$—'s not adjoining each other are each optionally substituted with —O—),
(b) a 1,4-phenylene group (in which one —CH= or at least two —CH='s not adjoining each other are each optionally substituted with —N=), and
(c) (c) a naphthalene-2,6-diyl group, a 1,2,3,4-tetrahydronaphthalene-2,6-diyl group, or a decahydronaphthalene-2,6-diyl group (in the naphthalene-2,6-diyl group or the 1,2,3,4-tetrahydronaphthalene-2,6-diyl group, one —CH= or at least two —CH='s not adjoining each other are each optionally substituted with —N=);
the groups (a) to (c) are each independently optionally substituted with a cyano group, a fluorine atom, or a chlorine atom;

$Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

in the case where $n^{L1}$ is 2 or 3 and where $A^{L2}$ is multiple, the multiple $A^{L2}$'s may be the same as or different from each other; in the case where $n^{L1}$ is 2 or 3 and where $Z^{L3}$ is multiple, the multiple $Z^{L3}$'s may be the same as or different from each other; and the compound represented by General Formula (L) excludes the compound represented by General Formula (i)). The present invention also provides a liquid crystal display device using such a liquid crystal composition.

Advantageous Effects of Invention

The liquid crystal composition of the present invention retains sufficiently low viscosity (η), sufficiently low rotational viscosity (γ1), a large elastic constant ($K_{33}$), and negative dielectric anisotropy (Δε) with a large absolute value without suffering reductions in refractive index anisotropy (Δn) and nematic phase-isotropic liquid phase transition temperature ($T_{ni}$); hence, a liquid crystal display device of, for instance, a VA type, which uses such a liquid crystal composition, has a quick response speed and excellent display quality with defective display being eliminated or reduced.

DESCRIPTION OF EMBODIMENTS

The liquid crystal composition of the present invention contains a first component that is at least one compound represented by General Formula (i).

[Chem. 6]

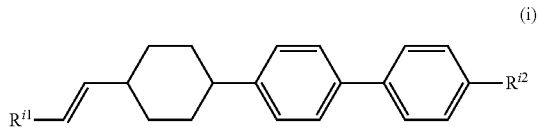

(i)

In General Formula (i), $R^{i1}$ represents an alkyl group having 1 to 8 carbon atoms, preferably an alkyl group having 1 to 5 carbon atoms, more preferably an alkyl group having 1 to 3 carbon atoms, and most preferably a methyl group. $R^{i2}$ represents an alkyl group having 3 to 8 carbon atoms, preferably an alkyl group having 3 to 6 carbon atoms, more preferably an alkyl group having 3 or 4 carbon atoms, and most preferably an alkyl group having 3 carbon atoms.

Examples of "the alkyl group having 1 to 8 carbon atoms" in the present invention include a methyl group, an ethyl group, a propyl group, a butyl group, an isopentyl group, a neopentyl group, a pentyl group, a hexyl group, a heptyl group, an octyl group, an isopropyl group, an isobutyl group, an isopentyl group, an isohexyl group, an isoheptyl group, an isooctyl group, a t-butyl group, and a 3-pentyl group. Such examples of the alkyl group herein hold true for the entire description, and an appropriate alkyl group is selected from the above-mentioned examples on the basis of the number of carbon atoms. The alkyl group having 1 to 8 carbon atoms in the present invention is preferably linear or branched, and more preferably linear.

More specifically, the compound represented by General Formula (i) is preferably any of the following compounds.

[Chem. 7]

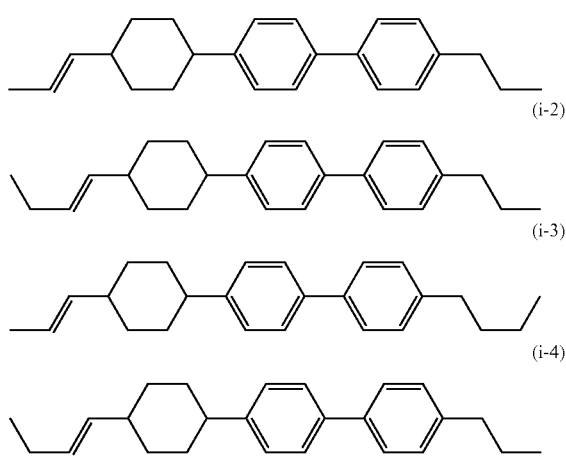

(i-1)
(i-2)
(i-3)
(i-4)

The compound is more preferably any of compounds represented by Formulae (i.1) to (i.4).

The amount of the compound represented by General Formula (i) in the liquid crystal composition of the present invention is preferably in the range of 0.1 mass % to 30 mass %, also preferably 0.1 mass % to 25 mass %, also preferably 0.2 mass % to 20 mass %, also preferably 0.2 mass % to 15 mass %, also preferably 0.5 mass % to 10 mass %, also preferably 1 mass % to 10 mass %, and also preferably 1 mass % to 8 mass %.

The lower limit of the amount of the first component in the liquid crystal composition of the present invention is, for example, 0.1 mass % in an embodiment of the present invention, 0.2 mass % in another embodiment of the present invention, 0.5 mass % in another embodiment of the present invention, and 1 mass % in another embodiment of the present invention relative to the amount of the whole liquid crystal composition of the present invention (100 mass %).

The upper limit of the amount of the first component in the liquid crystal composition of the present invention is, for instance, 30 mass % in an embodiment of the present invention, 25 mass % in another embodiment of the present invention, 20 mass % in another embodiment of the present invention, 10 mass % in another embodiment of the present invention, and 8 mass % in another embodiment of the present invention relative to the amount of the whole liquid crystal composition of the present invention.

The liquid crystal composition of the present invention contains a second component that is at least one compound selected from compounds represented by General Formula (L). The compound represented by General Formula (L) is a substantially dielectrically neutral compound ($\Delta\epsilon$ from $-2$ to $2$).

[Chem. 8]

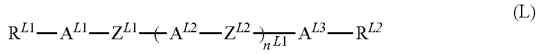

(L)

In General Formula (L), $R^{L1}$ and $R^{L2}$ each independently represent an alkyl group having 1 to 8 carbon atoms; in the alkyl group, one $-CH_2-$ or at least two $-CH_2-$'s not adjoining each other are each independently optionally substituted with $-CH=CH-$, $-C\equiv C-$, $-O-$, $-CO-$, $-COO-$, or $-OCO-$;

$n^{L1}$ represents 0, 1, 2, or 3;

$A^{L1}$, $A^{L2}$, and $A^{L3}$ each independently represent a group selected from the group consisting of (a) a 1,4-cyclohexylene group (in which one $-CH_2-$ or at least two $-CH_2-$'s not adjoining each other are each optionally substituted with $-O-$), (b) a 1,4-phenylene group (in which one $-CH=$ or at least two $-CH=$'s not adjoining each other are each optionally substituted with $-N=$), and (c) a naphthalene-2,6-diyl group, a 1,2,3,4-tetrahydronaphthalene-2,6-diyl group, or a decahydronaphthalene-2,6-diyl group (in the naphthalene-2,6-diyl group or the 1,2,3,4-tetrahydronaphthalene-2,6-diyl group, one $-CH=$ or at least two $-CH=$'s not adjoining each other are each optionally substituted with $-N=$);

the groups (a) to (c) are each independently optionally substituted with a cyano group, a fluorine atom, or a chlorine atom;

$Z^{L1}$ and $Z^{L2}$ each independently represent a single bond, $-CH_2CH_2-$, $-(CH_2)_4-$, $-OCH_2-$, $-CH_2O-$, $-COO-$, $-OCO-$, $-OCF_2-$, $-CF_2O-$, $-CH=N-N=CH-$, $-CH=CH-$, $-CF=CF-$, or $-C\equiv C-$;

in the case where $n^{L1}$ is 2 or 3 and where $A^{L2}$ is multiple, the multiple $A^{L2}$'s may be the same as or different from each other; in the case where $n^{L1}$ is 2 or 3 and where $Z^{L3}$ is multiple, the multiple $Z^{L3}$'s may be the same as or different from each other; and the compound represented by General Formula (L) excludes the compound represented by General Formula (i).

The compounds represented by General Formula (L) may be used alone or in combination. Such compounds can be used in any combination; a proper combination of the compounds is determined on the basis of predetermined properties such as solubility at low temperature, transition temperature, electric reliability, and birefringence. In an embodiment of the present invention, for example, one of such compounds is used. Furthermore, two of the compounds are used in another embodiment of the present invention, three of the compounds are used in another embodiment, four of the compounds are used in another embodiment, five of the compounds are used in another embodiment, six of the compounds are used in another embodiment, seven of the compounds are used in another embodiment, eight of the compounds are used in another embodiment, nine of the compounds are used in another embodiment, and ten or more of the compounds are used in another embodiment.

In the composition of the present invention, the amount of the compound represented by General Formula (L) needs to be appropriately adjusted on the basis of the intended properties such as solubility at low temperature, transition temperature, electric reliability, birefringence, process adaptability, droplet stains, image-sticking, and dielectric anisotropy.

The amount of the compound represented by General Formula (L) is preferably from 1 mass % to 80 mass %, also preferably 10 mass % to 70 mass %, also preferably 20 mass % to 60 mass %, also preferably 25 mass % to 55 mass %, also preferably 25 mass % to 55 mass %, also preferably 25 mass % to 50 mass %, also preferably 30 mass % to 50 mass %, and also preferably 35 mass % to 50 mass %.

More specifically, the lower limit of the amount of the compound represented by General Formula (L) in the composition is preferably not less than 1 mass %, also preferably not less than 10 mass %, also preferably not less than 20 mass %, also preferably not less than 25 mass %, also preferably not less than 29 mass %, also preferably not less than 30 mass %, and also preferably not less than 35 mass %.

The upper limit of the amount is preferably not more than 80 mass %, also preferably not more than 70 mass %, also preferably not more than 60 mass %, also preferably not more than 55 mass %, and also preferably not more than 50 mass %.

In the case where the composition of the present invention needs to have a viscosity kept at a low level to contribute to a high response speed, it is preferred that the above-mentioned lower limit be high and that the upper limit be high. In the case where the composition of the present invention needs to have a Tni kept at a high level to have a high temperature stability, it is preferred that the above-mentioned lower limit be high and that the upper limit be high. In order to increase dielectric anisotropy for keeping driving voltage at a low level, it is preferred that the above-mentioned lower limit be low and that the upper limit be low.

In the case of focusing on the reliability, $R^{L1}$ and $R^{L2}$ are each preferably an alkyl group; in the case of focusing on a reduction in the volatility of the compound, they are each preferably an alkoxy group; and in the case of focusing on a reduction in the viscosity, at least one of them is preferably an alkenyl group.

In the case where the ring structures bonded to $R^{L1}$ and $R^{L2}$ are phenyl groups (aromatics), $R^{L1}$ and $R^{L2}$ are each preferably a linear alkyl group having 1 to 5 carbon atoms, a linear alkoxy group having 1 to 5 carbon atoms, or an alkenyl group having 2 to 5 carbon atoms; in the case where the ring structures bonded to $R^{L1}$ and $R^{L2}$ are saturated rings such as cyclohexane, pyran, and dioxane, $R^{L1}$ and $R^{L2}$ are each preferably a linear alkyl group having 1 to 5 carbon atoms, a linear alkoxy group having 1 to 4 carbon atoms, or a linear alkenyl group having 2 to 5 carbon atoms. In order to produce a stable nematic phase, the total of carbon atoms or, if any, oxygen atoms is preferably not more than five, and $R^{L1}$ and $R^{L2}$ are preferably linear.

The alkenyl group is preferably any group selected from groups represented by Formulae (R1) to (R5) (the black point in each of the formulae represents the carbon atom in the ring structure)

[Chem. 9]

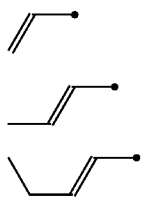

(R1)

(R2)

(R3)

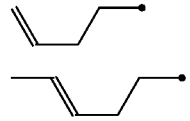

(R4)

(R5)

In the case of focusing on the response speed, $n^{L1}$ is preferably 0; in order to improve the upper limit of the temperature of the nematic phase, $n^{L1}$ is preferably 2 or 3; and in order to take a balance therebetween, $n^{L1}$ is preferably 1. In order to satisfy the properties necessary for the composition, compounds having a difference in $n^{L1}$ are preferably used in combination.

$A^{L1}$, $A^{L2}$, and $A^{L3}$ are preferably aromatic for large Δn or aliphatic for an improvement in the response speed. They are each independently preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; more preferably any of the following structures; and

[Chem. 10]

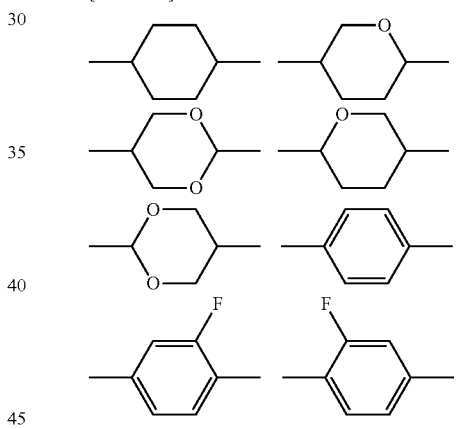

further preferably a trans-1,4-cyclohexylene group or a 1,4-phenylene group.

$Z^{L1}$ and $Z^{L2}$ are each preferably a single bond in the case of focusing on the response speed.

The composition preferably contains at least one compound represented by General Formula (L-1) as the compound represented by General Formula (L).

[Chem. 11]

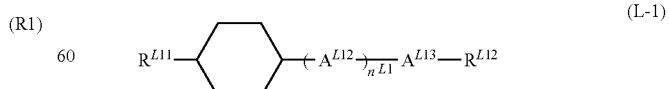

(L-1)

(in the formula, $R^{L11}$, $R^{L12}$, $A^{L12}$, and $A^{L13}$ independently have the same meanings as $R^{L1}$, $R^{L2}$, $A^{L2}$, and $A^{L3}$ in General Formula (L), respectively; and $n^{L11}$ represents 0 or 1)

$R^{L11}$ and $R^{L12}$ are each preferably a linear alkyl group having 1 to 5 carbon atoms, a linear alkoxy group having 1 to 5 carbon atoms, or a linear alkenyl group having 2 to 5 carbon atoms.

The compounds represented by General Formula (L-1) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The amount of the compound represented by General Formula (L-1) is preferably in the range of 1 mass % to 80 mass %, also preferably 10 mass % to 70 mass %, also preferably 20 mass % to 60 mass %, also preferably 25 mass % to 55 mass %, also preferably 29 mass % to 55 mass %, also preferably 29 mass % to 50 mass %, also preferably 30 mass % to 50 mass %, and also preferably 35 mass % to 50 mass %.

More specifically, the lower limit of the amount of the compound represented by General Formula (L-1) in the composition is preferably not less than 1 mass %, also preferably not less than 10 mass %, also preferably not less than 20 mass %, also preferably not less than 25 mass %, also preferably not less than 29 mass %, also preferably not less than 30 mass %, and also preferably not less than 35 mass %.

The upper limit of the amount is preferably not more than 80 mass %, also preferably not more than 70 mass %, also preferably not more than 60 mass %, also preferably not more than 55 mass %, and also preferably not more than 50 mass %.

In the case where the composition of the present invention needs to have a viscosity kept at a low level to contribute to a high response speed, it is preferred that the above-mentioned lower limit be high and that the upper limit be high. In the case where the composition of the present invention needs to have a Tni kept at a high level to have a high temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

The compound represented by General Formula (L-1) is preferably a compound selected from the group consisting of compounds represented by General Formulae (L-1-1) to (L-1-4). In particular, at least one of compounds represented by General Formula (L-1-1) and/or General Formula (L-1-4) is preferred.

The compound represented by General Formula (L-1-1) is as follows.

[Chem. 12]

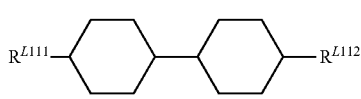

(L-1-1)

(in the formula, $R^{L111}$ and $R^{L112}$ independently have the same meanings as $R^{L1}$ and $R^{L2}$ in General Formula (L), respectively)

$R^{L111}$ and $R^{L112}$ are each preferably a linear alkyl group having 1 to 5 carbon atoms, a linear alkoxy group having 1 to 4 carbon atoms, or a linear alkenyl group having 2 to 5 carbon atoms.

The compounds represented by General Formula (L-1-1) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The lower limit of the preferred amount of the compound represented by General Formula (L-1-1) is 1 mass %, 2 mass %, 3 mass %, 5 mass %, 7 mass %, 10 mass %, 15 mass %, 20 mass %, 25 mass %, 30 mass %, 35 mass %, 40 mass %, 45 mass %, 50 mass %, or 55 mass % relative to the amount of the whole composition of the present invention. The upper limit of the preferred amount is 95 mass %, 90 mass %, 85 mass %, 80 mass %, 75 mass %, 70 mass %, 65 mass %, 60 mass %, 55 mass %, 50 mass %, 45 mass %, 40 mass %, 35 mass %, 30 mass %, or 25 mass % relative to the amount of the whole composition of the present invention.

In the case where the composition of the present invention needs to have a viscosity kept at a low level to contribute to a high response speed, it is preferred that the above-mentioned lower limit be high and that the upper limit be high. In the case where the composition of the present invention needs to have a Tni kept at a high level to have a high temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

The compound represented by General Formula (L-1-1) is preferably a compound selected from the group consisting of compounds represented by General Formula (L-1-1-1).

[Chem. 13]

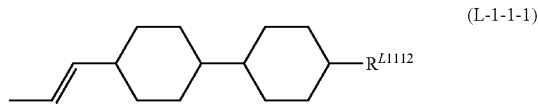

(L-1-1-1)

(in the formula, $R^{L1112}$ has the same meaning as $R^{L2}$ in General Formula (L))

The compound represented by General Formula (L-1-1-1) is preferably a compound selected from the group consisting of compounds represented by Formulae (L-1-1-1.1) to (L-1-1-1.3), also preferably the compound represented by Formula (L-1-1-1.2) or Formula (L-1-1-1.3), and especially preferably the compound represented by Formula (L-1-1-1.3).

[Chem. 14]

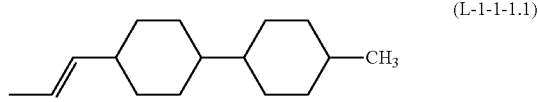

(L-1-1-1.1)

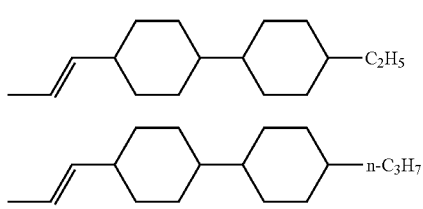

(L-1-1-1.2)

(L-1-1-1.3)

The lower limit of the preferred amount of the compound represented by Formula (L-1-1-1.3) is 1 mass %, 2 mass %, 3 mass %, 5 mass %, 7 mass %, or 10 mass % relative to the amount of the whole composition of the present invention. The upper limit of the preferred amount is 20 mass %, 15 mass %, 13 mass %, 10 mass %, 8 mass %, 7 mass %, 6 mass %, 5 mass %, or 3 mass % relative to the amount of the whole composition of the present invention.

The compound represented by General Formula (L-1-1) is preferably a compound selected from the group consisting of compounds represented by General Formula (L-1-1-2).

[Chem. 15]

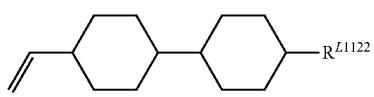

(L-1-1-2)

(in the formula, $R^{L1122}$ has the same meaning as $R^{L2}$ in General Formula (L))

The lower limit of the preferred amount of the compound represented by Formula (L-1-1-2) is 1 mass %, 5 mass %, 10 mass %, 15 mass %, 17 mass %, 20 mass %, 23 mass %, 25 mass %, 27 mass %, 30 mass %, or 35 mass % relative to the amount of the whole composition of the present invention. The upper limit of the preferred amount is 60 mass %, 55 mass %, 50 mass %, 45 mass %, 42 mass %, 40 mass %, 38 mass %, 35 mass %, 33 mass %, or 30 mass % relative to the amount of the whole composition of the present invention.

The compound represented by General Formula (L-1-1-2) is preferably a compound selected from the group consisting of compounds represented by Formulae (L-1-1-2.1) to (L-1-1-2.4), and also preferably any of the compounds represented by Formulae (L-1-1-2.2) to (L-1-1-2.4). In particular, the compound represented by Formula (L-1-1-2.2) is preferred because it especially enhances the response speed of the composition of the present invention. In the case where high Tni is needed rather than the response speed, it is preferred that the compound represented by Formula (L-1-1-2.3) or (L-1-1-2.4) be employed. In order to improve solubility at low temperature, it is preferred that the amount of each of the compounds represented by Formulae (L-1-1-2.3) and (L-1-1-2.4) be less than 30 mass %.

[Chem. 16]

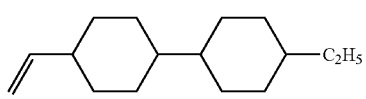

(L-1-1-2.1)

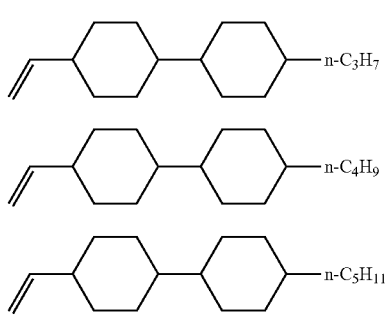

(L-1-1-2.2)

(L-1-1-2.3)

(L-1-1-2.4)

The lower limit of the preferred amount of the compound represented by Formula (L-1-1-2.2) is 10 mass %, 15 mass %, 18 mass %, 20 mass %, 23 mass %, 25 mass %, 27 mass %, 30 mass %, 33 mass %, 35 mass %, 38 mass %, or 40 mass % relative to the amount of the whole composition of the present invention. The upper limit of the preferred amount is 60 mass %, 55 mass %, 50 mass %, 45 mass %, 43 mass %, 40 mass %, 38 mass %, 35 mass %, 32 mass %, 30 mass %, 27 mass %, 25 mass %, or 22 mass % relative to the amount of the whole composition of the present invention.

The lower limit of the preferred amount of a combination of the compounds represented by Formulae (L-1-1-1.3) and (L-1-1-2.2) is 10 mass %, 15 mass %, 20 mass %, 25 mass %, 27 mass %, 30 mass %, 35 mass %, or 40 mass % relative to the amount of the whole composition of the present invention. The upper limit of the preferred amount is 60 mass %, 55 mass %, 50 mass %, 45 mass %, 43 mass %, 40 mass %, 38 mass %, 35 mass %, 32 mass %, 30 mass %, 27 mass %, 25 mass %, or 22 mass % relative to the amount of the whole composition of the present invention.

The compound represented by General Formula (L-1-1) is preferably a compound selected from the group consisting of compounds represented by General Formula (L-1-1-3).

[Chem. 17]

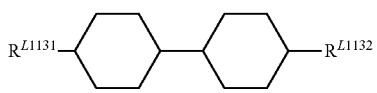

(L-1-1-3)

(in the formula, $R^{L1131}$ and $R^{L1132}$ each independently represent an alkyl group having 1 to 8 carbon atoms or an alkoxy group having 1 to 8 carbon atoms)

$R^{L1131}$ and $R^{L1132}$ are each preferably a linear alkyl group having 1 to 5 carbon atoms, a linear alkoxy group having 1 to 4 carbon atoms, or a linear alkenyl group having 2 to 5 carbon atoms.

The lower limit of the preferred amount of the compound represented by Formula (L-1-1-3) is 1 mass %, 5 mass %, 10 mass %, 13 mass %, 15 mass %, 17 mass %, 20 mass %, 23 mass %, 25 mass %, or 30 mass % relative to the amount of the whole composition of the present invention. The upper limit of the preferred amount is 60 mass %, 55 mass %, 50 mass %, 45 mass %, 40 mass %, 37 mass %, 35 mass %, 33 mass %, 30 mass %, 27 mass %, 25 mass %, 23 mass %, 20 mass %, 17 mass %, 15 mass %, 13 mass %, or 10 mass % relative to the amount of the whole composition of the present invention.

The compound represented by General Formula (L-1-1-3) is preferably a compound selected from the group consisting of compounds represented by Formulae (L-1-1-3.1) to (L-1-1-3.4) and compounds represented by Formulae (L-1-1-3.11) and (L-1-1-3.12), and also preferably any of the compounds represented by Formulae (L-1-1-3.1), (L-1-1-3.3), and (L-1-1-3.4). In particular, the compound represented by Formula (L-1-1-3.1) is preferred because it especially enhances the response speed of the composition of the present invention. In the case where high Tni is needed rather than the response speed, it is preferred that the compound represented by Formula (L-1-1-3.3), (L-1-1-3.4), (L-1-1-3.11), or (L-1-1-3.12) be employed. In order to improve solubility at low temperature, it is preferred that the total amount of the compounds represented by Formulae (L-1-1-3.3), (L-1-1-3.11), and (L-1-1-3.12) be less than 20 mass %.

[Chem. 18]

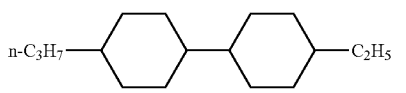
(L-1-1-3.1)

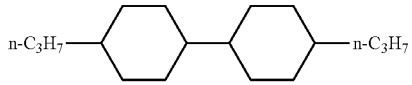
(L-1-1-3.2)

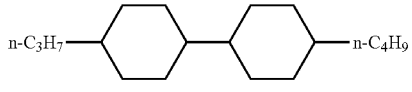
(L-1-1-3.3)

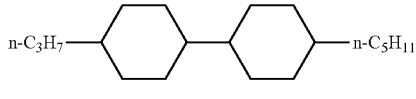
(L-1-1-3.4)

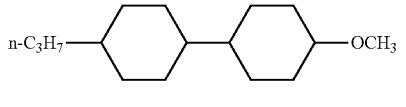
(L-1-1-3.11)

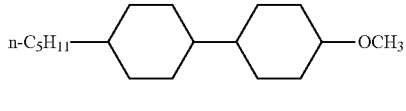
(L-1-1-3.12)

The lower limit of the preferred amount of the compound represented by Formula (L-1-1-3.1) is 1 mass %, 2 mass %, 3 mass %, 5 mass %, 7 mass %, 10 mass %, 13 mass %, 15 mass %, 18 mass %, or 20 mass % relative to the amount of the whole composition of the present invention. The upper limit of the preferred amount is 20 mass %, 17 mass %, 15 mass %, 13 mass %, 10 mass %, 8 mass %, 7 mass %, or 6 mass % relative to the amount of the whole composition of the present invention.

The compound represented by General Formula (L-1-1) is preferably a compound selected from the group consisting of compounds represented by General Formula (L-1-1-4) and/or General Formula (L-1-1-5).

[Chem. 19]

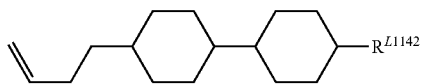
(L-1-1-4)

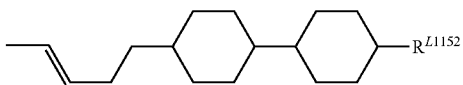
(L-1-1-5)

(in the formulae, $R^{L1142}$ and $R^{L1152}$ each independently represent an alkyl group having 1 to 8 carbon atoms or an alkoxy group having 1 to 8 carbon atoms)

$R^{L1142}$ and $R^{L1152}$ are each preferably a linear alkyl group having 1 to 5 carbon atoms, a linear alkoxy group having 1 to 4 carbon atoms, or a linear alkenyl group having 2 to 5 carbon atoms.

The lower limit of the preferred amount of the compound represented by Formula (L-1-1-4) is 1 mass %, 5 mass %, 10 mass %, 13 mass %, 15 mass %, 17 mass %, or 20 mass % relative to the amount of the whole composition of the present invention. The upper limit of the preferred amount is 25 mass %, 23 mass %, 20 mass %, 17 mass %, 15 mass %, 13 mass %, or 10 mass % relative to the amount of the whole composition of the present invention.

The lower limit of the preferred amount of the compound represented by Formula (L-1-1-5) is 1 mass %, 5 mass %, 10 mass %, 13 mass %, 15 mass %, 17 mass %, or 20 mass % relative to the amount of the whole composition of the present invention. The upper limit of the preferred amount is 25 mass %, 23 mass %, 20 mass %, 17 mass %, 15 mass %, 13 mass %, or 10 mass % relative to the amount of the whole composition of the present invention.

The compounds represented by General Formulae (L-1-1-4) and (L-1-1-5) are preferably compounds selected from the group consisting of compounds represented by Formulae (L-1-1-4.1) to (L-1-1-5.3), and also preferably the compounds represented by Formulae (L-1-1-4.2) and (L-1-1-5.2).

[Chem. 20]

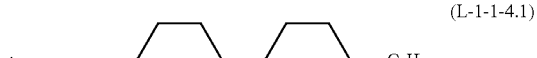
(L-1-1-4.1)

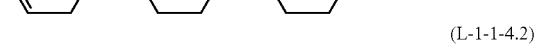
(L-1-1-4.2)

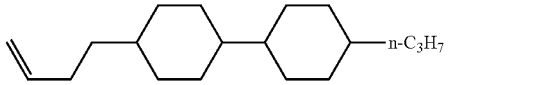
(L-1-1-4.3)

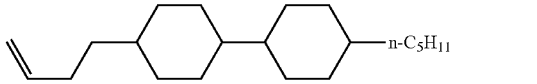
(L-1-1-5.1)

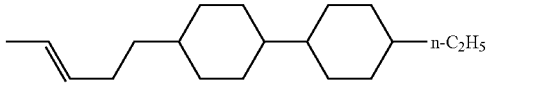
(L-1-1-5.2)

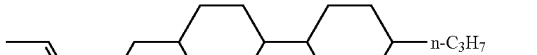

-continued (L-1-1-5.3)

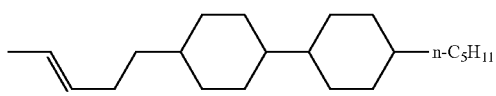

The lower limit of the preferred amount of the compound represented by Formula (L-1-1-4.2) is 1 mass %, 2 mass %, 3 mass %, 5 mass %, 7 mass %, 10 mass %, 13 mass %, 15 mass %, 18 mass %, or 20 mass % relative to the amount of the whole composition of the present invention. The upper limit of the preferred amount is 20%, 17 mass %, 15 mass %, 13 mass %, 10 mass %, 8 mass %, 7 mass %, or 6 mass % relative to the amount of the whole composition of the present invention.

At least two compounds selected from the compounds represented by Formulae (L-1-1-1.3), (L-1-1-2.2), (L-1-1-3.1), (L-1-1-3.3), (L-1-1-3.4), (L-1-1-3.11), and (L-1-1-3.12) are preferably used in combination; and at least two compounds selected from the compounds represented by Formulae (L-1-1-1.3), (L-1-1-2.2), (L-1-1-3.1), (L-1-1-3.3), (L-1-1-3.4), and (L-1-1-4.2) are also preferably used in combination. The lower limit of the preferred amount of a combination of these compounds is 1 mass %, 2 mass %, 3 mass %, 5 mass %, 7 mass %, 10 mass %, 13 mass %, 15 mass %, 18 mass %, 20 mass %, 23 mass %, 25 mass %, 27 mass %, 30 mass %, 33 mass %, or 35 mass % relative to the amount of the whole composition of the present invention. The upper limit thereof is 80 mass %, 70 mass %, 60 mass %, 50 mass %, 45 mass %, 40 mass %, 37 mass %, 35 mass %, 33 mass %, 30 mass %, 28 mass %, 25 mass %, 23 mass %, or 20 mass % relative to the amount of the whole composition of the present invention. In the case of focusing on the reliability of the composition, two or more compounds selected from the compounds represented by Formulae (L-1-1-3.1), (L-1-1-3.3), and (L-1-1-3.4) are preferably used in combination; in the case of focusing on the response speed of the composition, two or more compounds selected from the compounds represented by Formulae (L-1-1-1.3) and (L-1-1-2.2) are preferably used in combination.

The compound represented by General Formula (L-1-2) is as follows.

[Chem. 21]

(L-1-2)

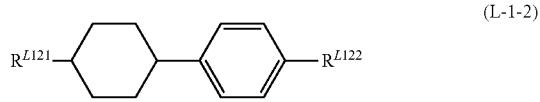

(in the formula, $R^{L121}$ and $R^{L122}$ independently have the same meanings as $R^{L1}$ and $R^{L2}$ in General Formula (L), respectively)

$R^{L121}$ is preferably an alkyl group having 1 to 5 carbon atoms or an alkenyl group having 2 to 5 carbon atoms, and $R^{L122}$ is preferably an alkyl group having 1 to 5 carbon atoms, an alkenyl group having 4 or 5 carbon atoms, or an alkoxy group having 1 to 4 carbon atoms.

The compounds represented by General Formula (L-1-2) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of solubility at low temperature, the amount is adjusted to be larger to produce a greater effect; in terms of response speed, the amount is adjusted to be smaller to produce a greater effect. In order to improve properties related to droplet stains and image-sticking, the range of the amount is preferably adjusted to be intermediate.

The lower limit of the preferred amount of the compound represented by Formula (L-1-2) is 1 mass %, 2 mass %, 3 mass %, 5 mass %, 7 mass %, or 10 mass % relative to the amount of the whole composition of the present invention. The upper limit of the preferred amount is 20 mass %, 15 mass %, 13 mass %, 10 mass %, 8 mass %, 7 mass %, 6 mass %, 5 mass %, or 3 mass % relative to the amount of the whole composition of the present invention.

The compound represented by General Formula (L-1-2) is preferably a compound selected from the group consisting of compounds represented by Formulae (L-1-2.1) to (L-1-2.6), and also preferably any of the compounds represented by Formulae (L-1-2.1), (L-1-2.3), (L-1-2.4), and (L-1-2.6).

[Chem. 22]

(L-1-2.1)

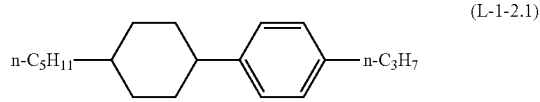

(L-1-2.2)

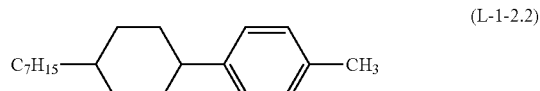

(L-1-2.3)

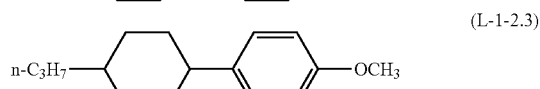

(L-1-2.4)

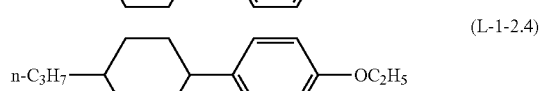

(L-1-2.5)

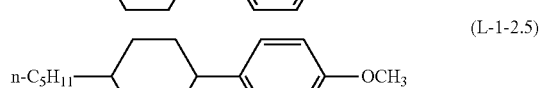

(L-1-2.6)

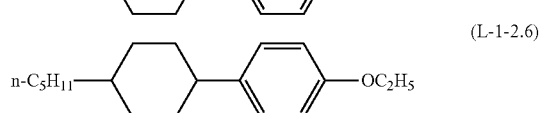

The compound represented by General Formula (L-1-3) is as follows.

[Chem. 23]

(L-1-3)

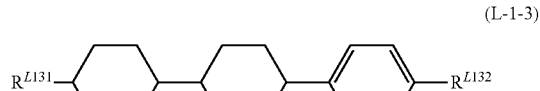

(in the formula, $R^{L131}$ and $R^{L132}$ independently have the same meanings as $R^{L1}$ and $R^{L2}$ in General Formula (L), respectively)

$R^{L131}$ is preferably an alkyl group having 1 to 5 carbon atoms or an alkenyl group having 2 to 5 carbon atoms, and $R^{L132}$ is preferably an alkyl group having 1 to 5 carbon atoms, an alkenyl group having 4 or 5 carbon atoms, or an alkoxy group having 1 to 4 carbon atoms.

The compounds represented by General Formula (L-1-3) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In the composition of the present invention, the amount of the compound represented by General Formula (L-1-3) needs to be appropriately adjusted on the basis of the intended properties such as solubility at low temperature, transition temperature, electric reliability, birefringence, process adaptability, droplet stains, image-sticking, and dielectric anisotropy.

The lower limit of the preferred amount of the compound represented by Formula (L-1-3) is 1 mass %, 2 mass %, 3 mass %, 5 mass %, 7 mass %, 10 mass %, 14 mass %, 16 mass %, 20 mass %, 23 mass %, 26 mass %, 30 mass %, 35 mass %, or 40 mass % relative to the amount of the whole composition of the present invention. The upper limit of the preferred amount of the compound represented by Formula (L-4) is 50 mass %, 40 mass %, 35 mass %, 30 mass %, 20 mass %, 15 mass %, 10 mass %, or 5 mass % relative to the amount of the whole composition of the present invention.

The compound represented by General Formula (L-1-3) is, for example, preferably any of compounds represented by Formulae (L-1-3.1) to (L-1-3.3).

[Chem. 24]

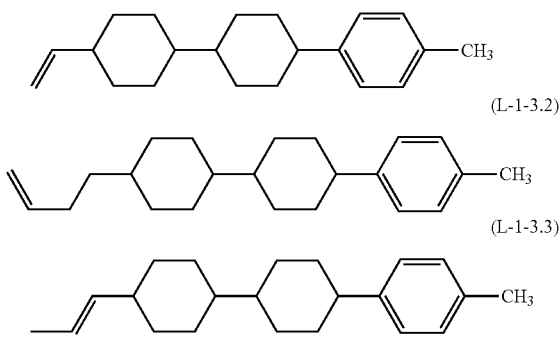

On the basis of the intended properties such as solubility at low temperature, transition temperature, electric reliability, and birefringence, the compound represented by Formula (L-1-3.1) may be used, the compound represented by Formula (L-1-3.2) may be used, both of the compound represented by Formula (L-1-3.1) and the compound represented by Formula (L-1-3.2) may be used, or all of the compounds represented by Formulae (L-1-3.1) to (L-4.3) may be used. The lower limit of the preferred amount of the compound represented by Formula (L-1-3.1) or (L-1-3.2) is 3 mass %, 5 mass %, 7 mass %, 9 mass %, 11 mass %, 12 mass %, 13 mass %, 18 mass %, or 21 mass % relative to the amount of the whole composition of the present invention. The upper limit of the preferred amount is 45 mass %, 40 mass %, 35 mass %, 30 mass %, 25 mass %, 23 mass %, 20 mass %, 18 mass %, 15 mass %, 13 mass %, 10 mass %, or 8 mass %.

In the case where both the compound represented by Formula (L-1-3.1) and the compound represented by Formula (L-1-3.2) are used, the lower limit of the preferred amount of these compounds is 15 mass %, 19 mass %, 24 mass %, or 30 mass % relative to the amount of the whole composition of the present invention; and the upper limit of the preferred amount is 45 mass %, 40 mass %, 35 mass %, 30 mass %, 25 mass %, 23 mass %, 20 mass %, 18 mass %, 15 mass %, or 13 mass %.

The compound represented by General Formula (L-1-3) is, for example, preferably any of compounds represented by Formulae (L-1-3.4) to (L-1-3.6), and also preferably the compound represented by Formula (L-1-3.4).

[Chem. 25]

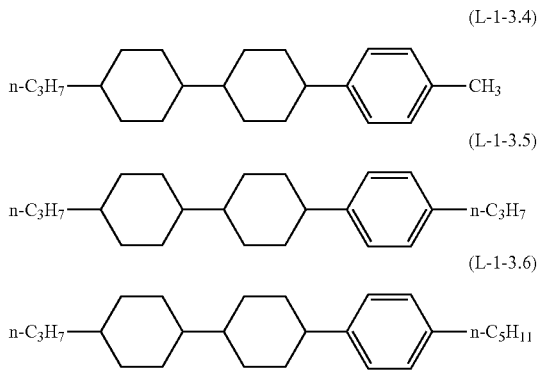

On the basis of the intended properties such as solubility at low temperature, transition temperature, electric reliability, and birefringence, the compound represented by Formula (L-1-3.4) may be used, the compound represented by Formula (L-1-3.5) may be used, and both of the compound represented by Formula (L-1-3.4) and the compound represented by Formula (L-1-3.5) may be used.

The lower limit of the preferred amount of the compound represented by Formula (L-1-3.4) or (L-1-3.5) is 3 mass %, 5 mass %, 7 mass %, 9 mass %, 11 mass %, 12 mass %, 13 mass %, 18 mass %, or 21 mass % relative to the amount of the whole composition of the present invention. The upper limit of the preferred amount is 45 mass %, 40 mass %, 35 mass %, 30 mass %, 25 mass %, 23 mass %, 20 mass %, 18 mass %, 15 mass %, 13 mass %, 10 mass %, or 8 mass %.

In the case where both the compound represented by Formula (L-1-3.4) and the compound represented by Formula (L-1-3.5) are used, the lower limit of the preferred amount of these compounds is 15 mass %, 19 mass %, 24 mass %, or 30 mass % relative to the amount of the whole composition of the present invention; and the upper limit of the preferred amount is 45 mass %, 40 mass %, 35 mass %, 30 mass %, 25 mass %, 23 mass %, 20 mass %, 18 mass %, 15 mass %, or 13 mass %.

The compound represented by General Formula (L-1-3) is, for example, preferably any of compounds represented by Formulae (L-1-3.7) to (L-1-3.10), and especially preferably the compound represented by Formula (L-1-3.9).

[Chem. 26]

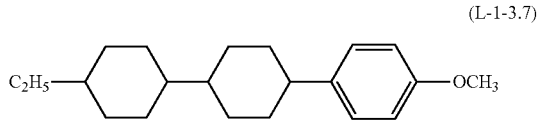

-continued

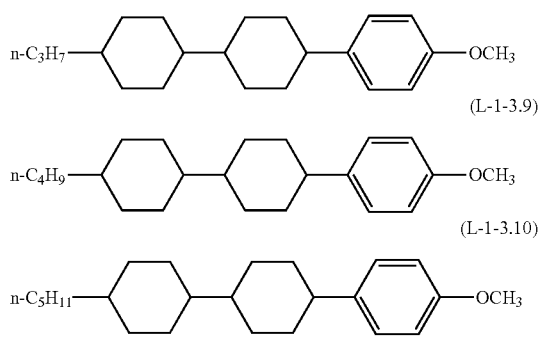

(L-1-3.8)
(L-1-3.9)
(L-1-3.10)

The compound represented by General Formula (L-1-4) is as follows.

[Chem. 27]

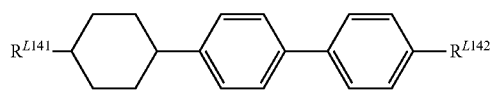

(L-1-4)

(in the formula, $R^{L141}$ and $R^{L142}$ independently have the same meanings as $R^{L1}$ and $R^{L2}$ in General Formula (L), respectively)

$R^{L141}$ is preferably an alkyl group having 1 to 5 carbon atoms or an alkenyl group having 2 to 5 carbon atoms, and $R^{L142}$ is preferably an alkyl group having 1 to 5 carbon atoms, an alkenyl group having 4 or 5 carbon atoms, or an alkoxy group having 1 to 4 carbon atoms.

The compounds represented by General Formula (L-1-4) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In the composition of the present invention, the amount of the compound represented by General Formula (L-1-4) needs to be appropriately adjusted on the basis of the intended properties such as solubility at low temperature, transition temperature, electric reliability, birefringence, process adaptability, droplet stains, image-sticking, and dielectric anisotropy.

The lower limit of the preferred amount of the compound represented by Formula (L-1-4) is 1 mass %, 2 mass %, 3 mass %, 5 mass %, 7 mass %, 10 mass %, 14 mass %, 16 mass %, 20 mass %, 23 mass %, 26 mass %, 30 mass %, 35 mass %, or 40 mass % relative to the amount of the whole composition of the present invention. The upper limit of the preferred amount of the compound represented by Formula (L-1-4) is 50 mass %, 40 mass %, 35 mass %, 30 mass %, 20 mass %, 15 mass %, 10 mass %, or 5 mass % relative to the amount of the whole composition of the present invention.

The compound represented by General Formula (L-1-4) is, for example, preferably any of compounds represented by Formulae (L-1-4.1) and (L-1-4.2), and especially preferably the compound represented by Formula (L-1-4.1).

The lower limit of the preferred amount of such compounds is 1 mass %, 2 mass %, 3 mass %, 5 mass %, or 7 mass % relative to the amount of the whole composition of the present invention. The upper limit of the preferred amount thereof is 20 mass %, 15 mass %, 13 mass %, 10 mass %, or 9 mass %.

[Chem. 28]

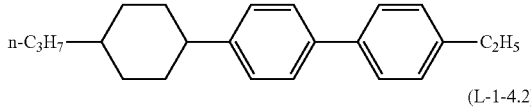

(L-1-4.1)

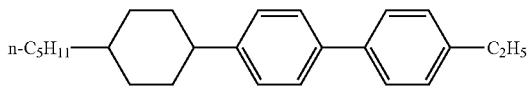

(L-1-4.2)

The compound represented by General Formula (L-1-4) is, for example, preferably any of compounds represented by Formulae (L-1-4.3) and (L-1-4.4).

The lower limit of the preferred amount of such compounds is 1 mass %, 2 mass %, 3 mass %, 5 mass %, or 7 mass % relative to the amount of the whole composition of the present invention. The upper limit of the preferred amount thereof is 20 mass %, 15 mass %, 13 mass %, 10 mass %, or 9 mass %.

[Chem. 29]

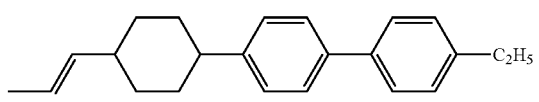

(L-1-4.3)

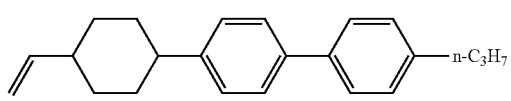

(L-1-4.4)

The compound represented by General Formula (L-1-4) is preferably a compound selected from the group consisting of compounds represented by Formulae (L-1-4.5) to (L-1-4.7), and especially preferably the compound represented by Formula (L-1-4.7).

The lower limit of the preferred amount of such compounds is 1 mass %, 2 mass %, 3 mass %, 5 mass %, or 7 mass % relative to the amount of the whole composition of the present invention. The upper limit of the preferred amount thereof is 20 mass %, 15 mass %, 13 mass %, 10 mass %, or 9 mass %.

[Chem. 30]

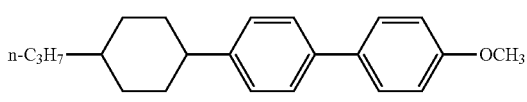

(L-1-4.5)

-continued

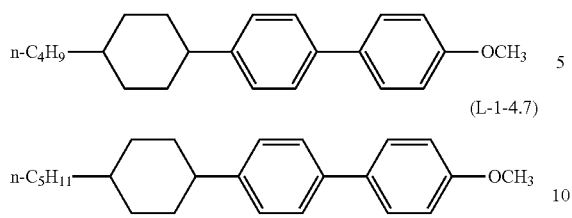

(L-1-4.6)

(L-1-4.7)

Besides the compounds represented by General Formulae (L-1-1) to (L-1-4), at least one of compounds represented by General Formulae (L-2) to (L-4) is preferably used as the compound represented by General Formula (L).

The compound represented by General Formula (L-2) is as follows.

[Chem. 31]

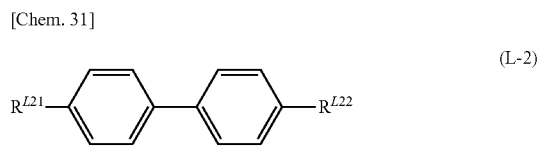

(L-2)

(in the formula, $R^{L21}$ and $R^{L22}$ independently have the same meanings as $R^{L1}$ and $R^{L2}$ in General Formula (L), respectively)

$R^{L21}$ and $R^{L22}$ are each independently preferably an alkyl group having 1 to 5 carbon atoms, an alkenyl group having 4 or 5 carbon atoms, or an alkoxy group having 1 to 4 carbon atoms.

The compounds represented by General Formula (L-2) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The lower limit of the preferred amount of the compound represented by Formula (L-2) is 1 mass %, 2 mass %, 3 mass %, 5 mass %, 7 mass %, or 10 mass % relative to the amount of the whole composition of the present invention. The upper limit of the preferred amount is 20 mass %, 15%, 13 mass %, 10 mass %, 8 mass %, 7 mass %, 6 mass %, 5 mass %, or 3 mass % relative to the amount of the whole composition of the present invention.

In terms of an enhancement in birefringence, the amount is adjusted to be larger to produce a greater effect; in terms of high Tni, the amount is adjusted to be smaller to produce a greater effect. In order to improve properties related to droplet stains and image-sticking, the range of the amount is preferably adjusted to be intermediate.

The compound represented by General Formulae (L-2) is preferably a compound selected from the group consisting of compounds represented by Formulae (L-2.1) to (L-2.4), and also preferably any of the compounds represented by Formulae (L-2.2) to (L-2.7).

[Chem. 32]

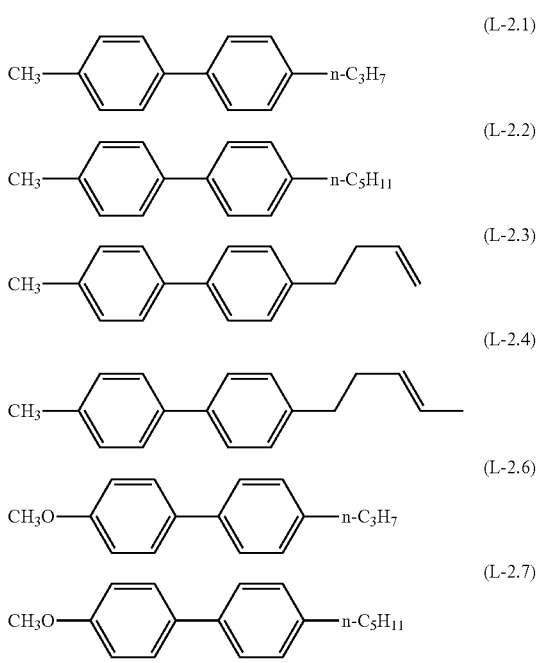

(L-2.1)

(L-2.2)

(L-2.3)

(L-2.4)

(L-2.6)

(L-2.7)

The compound represented by General Formula (L-3) is as follows.

[Chem. 33]

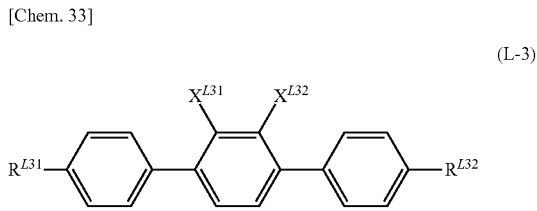

(L-3)

(in the formula, $R^{L31}$ and $R^{L32}$ independently have the same meanings as $R^{L1}$ and $R^{L2}$ in General Formula (L), respectively; and $X^{L31}$ and $X^{L32}$ each independently represent a hydrogen atom or a fluorine atom)

$R^{L31}$ and $R^{L32}$ are each independently preferably an alkyl group having 1 to 5 carbon atoms or an alkenyl group having 2 to 5 carbon atoms, and it is preferred that one of $X^{L31}$ and $X^{L32}$ be a fluorine atom and that the other one thereof be a hydrogen atom.

The compounds represented by General Formula (L-3) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The lower limit of the preferred amount of the compound represented by Formula (L-3) is 1 mass %, 2 mass %, 3 mass %, 5 mass %, 7 mass %, 10 mass %, 14 mass %, 16 mass %, 20 mass %, 23 mass %, 26 mass %, 30 mass %, 35 mass %, or 40 mass % relative to the amount of the whole composition of the present invention. The upper limit of the preferred amount of the compound represented by Formula (L-3) is 50 mass %, 40 mass %, 35 mass %, 30 mass %, 20 mass %, 15 mass %, 10 mass %, or 5 mass % relative to the amount of the whole composition of the present invention. In the case of focusing on an enhancement in Δn, the amount is preferably larger; in the case of focusing on a reduction in precipitation at low temperature, the amount is preferably smaller.

The compound represented by General Formula (L-3) is preferably any of compounds represented by Formulae (L-3.1) to (L-3.9).

[Chem. 34]

(L-3.1)
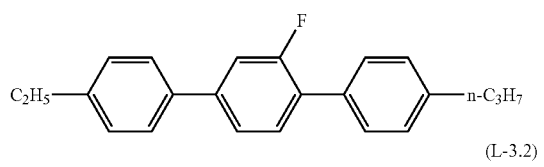

(L-3.2)
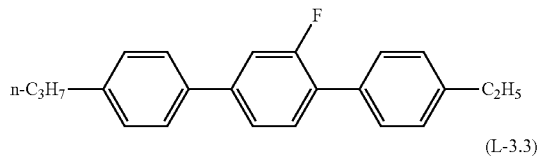

(L-3.3)
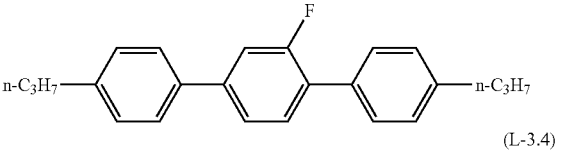

(L-3.4)
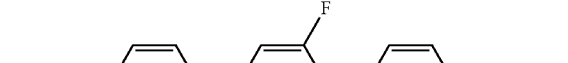

(L-3.5)
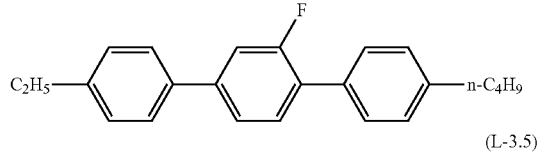

(L-3.6)
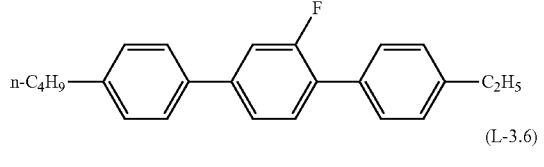

(L-3.7)
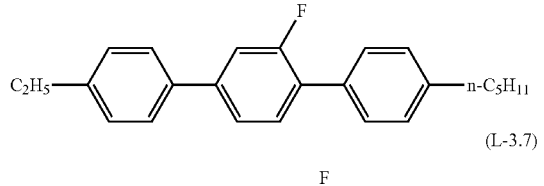

(L-3.8)
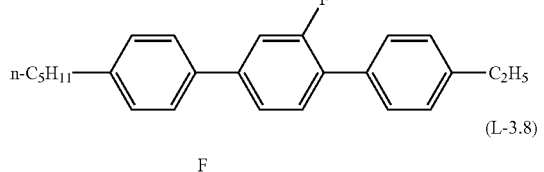

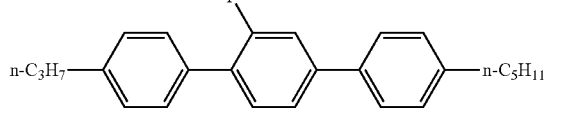

(L-3.9)
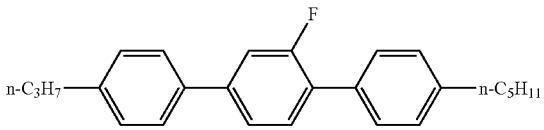

Such compounds can be used in any combination; one to three of the compounds are preferably used, and one to four of the compounds are more preferably used. Use of a compound having a broad molecular weight distribution is also effective in solubility; hence, a preferred example of use of these compounds is as follows: one compound is selected from the compounds represented by Formulae (L-3.1) and (L-3.2), one compound is selected from the compounds represented by Formulae (L-3.4) and (L-6.5), one compound is selected from the compounds represented by Formulae (L-3.6) and (L-3.7), one compound is selected from the compounds represented by Formulae (L-3.8) and (L-3.9), and a proper combination of the selected compounds is determined. In particular, it is preferred that the compound represented by Formula (L-6.1), the compound represented by Formula (L-3.3), the compound represented by Formula (L-3.4), the compound represented by Formula (L-3.6), and the compound represented by Formula (L-3.9) be used.

Furthermore, the compound represented by General Formula (L-3) is, for instance, preferably any of compounds represented by Formulae (L-3.10) to (L-3.17); in particular, the compound represented by Formula (L-3.11) is preferred.

[Chem. 35]

(L-3.10)
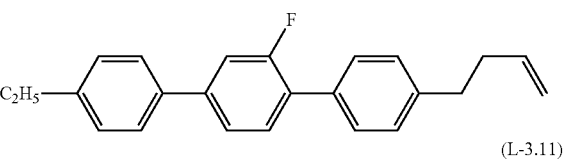

(L-3.11)
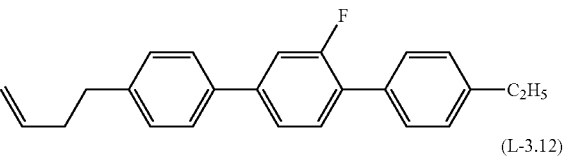

(L-3.12)
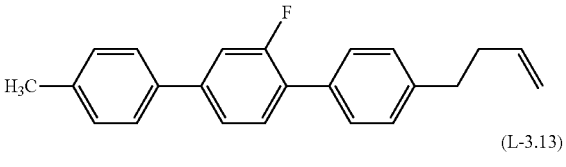

(L-3.13)
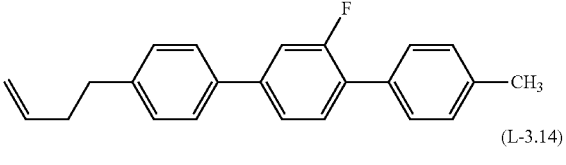

(L-3.14)
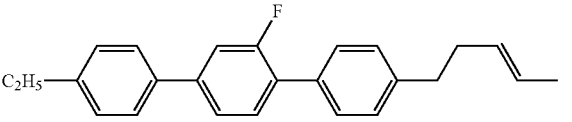

-continued (L-3.15)
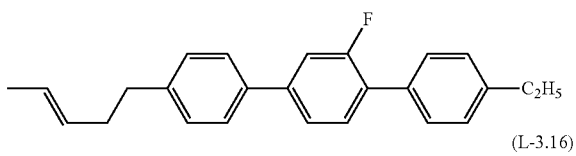

(L-3.16)
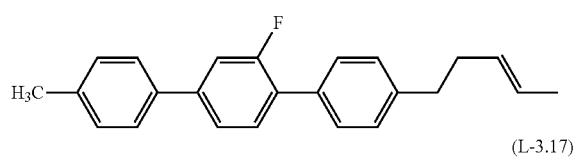

(L-3.17)

The lower limit of the preferred amount of such compounds is 1 mass %, 2 mass %, 3 mass %, 5 mass %, or 7 mass % relative to the amount of the whole composition of the present invention. The upper limit of the preferred amount thereof is 20 mass %, 15 mass %, 13 mass %, 10 mass %, or 9 mass %.

The compound represented by General Formula (L-4) is as follows.

[Chem. 36]

(L-4)
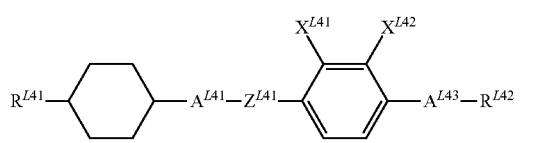

(in the formula, $R^{L41}$ and $R^{L42}$ independently have the same meanings as $R^{L1}$ and $R^{L2}$ in General Formula (L), respectively; $A^{L41}$ and $A^{L43}$ independently have the same meanings as $A^{L2}$ and $A^{L3}$ in General Formula (L), respectively; the hydrogen atoms of $A^{L41}$ and $A^{L42}$ are each independently optionally substituted with a fluorine atom, $Z^{L41}$ have the same meaning as $Z^{L1}$ in General Formula (L); and $X^{L41}$ and $X^{L42}$ each independently represent a fluorine atom or a hydrogen atom)

In the formula, $R^{L41}$ and $R^{L42}$ are each independently preferably an alkyl group having 1 to 5 carbon atoms, an alkenyl group having 2 to 5 carbon atoms, or an alkoxy group having 1 to 4 carbon atoms; $A^{L41}$ and $A^{L42}$ are each independently preferably a 1,4-cyclohexylene group or a 1,4-phenylene group; the hydrogen atoms of $A^{L41}$ and $A^{L42}$ are each independently optionally substituted with a fluorine atom; $Z^{L41}$ is preferably a single bond or COO—, and preferably a single bond; and $X^{L41}$ and $X^{L42}$ are each preferably a hydrogen atom.

Such compounds can be used in any combination; a combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, and four of the compounds are used in another embodiment.

In the composition of the present invention, the amount of the compound represented by General Formula (L-4) needs to be appropriately adjusted on the basis of the intended properties such as solubility at low temperature, transition temperature, electric reliability, birefringence, process adaptability, droplet stains, image-sticking, and dielectric anisotropy.

The lower limit of the preferred amount of the compound represented by Formula (L-4) is 1 mass %, 2 mass %, 3 mass %, 5 mass %, 7 mass %, 10 mass %, 14 mass %, 16 mass %, or 20 mass % relative to the amount of the whole composition of the present invention. The upper limit of the preferred amount of a compound represented by Formula (L-7) is 30 mass %, 25 mass %, 23 mass %, 20 mass %, 18 mass %, 15 mass %, 10 mass %, or 5 mass % relative to the amount of the whole composition of the present invention.

In an embodiment in which the composition of the present invention needs to have a high Tni, the amount of the compound represented by Formula (L-7) is preferably adjusted to be larger; in an embodiment in which the composition needs to have a low viscosity, the amount thereof is preferably adjusted to be smaller.

The compound represented by General Formula (L-4) is preferably any of compounds represented by Formulae (L-4.1) to (L-4.4), and also preferably the compound represented by Formula (L-4.2).

[Chem. 37]

(L-4.1)
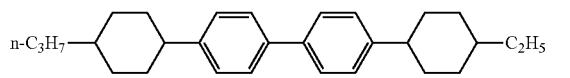

(L-4.2)
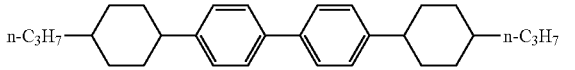

(L-4.3)
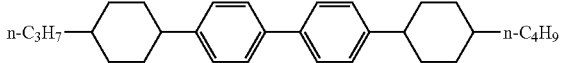

(L-4.4)
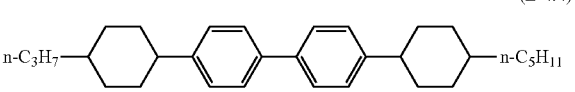

Furthermore, the compound represented by General Formula (L-4) is preferably any of compounds represented by Formulae (L-4.11) to (L-4.13), and also preferably the compound represented by Formula (L-4.11).

[Chem. 38]

(L-4.11)
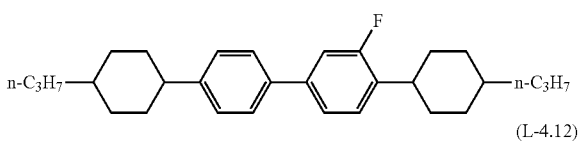

(L-4.12)
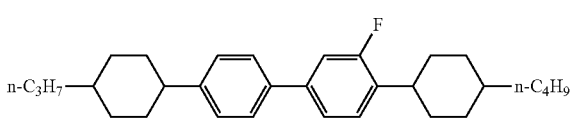

-continued (L-4.13)
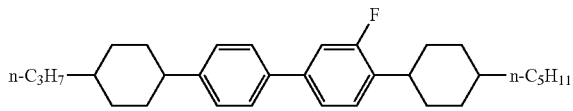

Moreover, the compound represented by General Formula (L-4) is any of compounds represented by Formulae (L-4.21) to (L-4.23), and preferably the compound represented by Formula (L-4.21).

[Chem. 39]

(L-4.21)

(L-4.22)

(L-4.23)
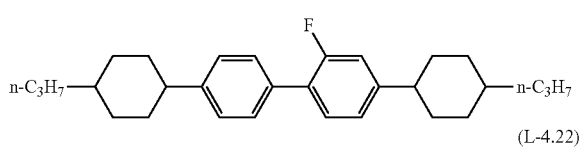
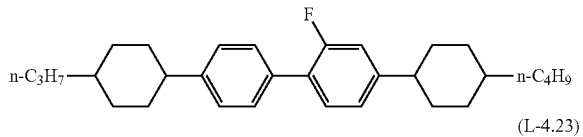
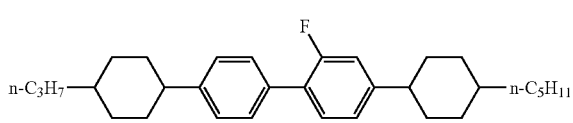

Furthermore, the compound represented by General Formula (L-4) is preferably any of compounds represented by Formulae (L-4.31) to (L-4.34), and also preferably the compound represented by Formula (L-4.31) and/or the compound represented by Formula (L-4.32).

[Chem. 40]

(L-4.31)

(L-4.32)

(L-4.33)

(L-4.34)
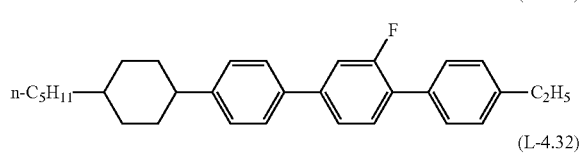
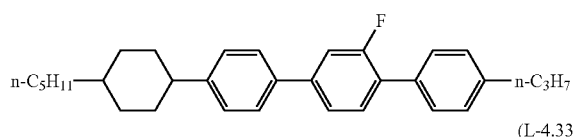
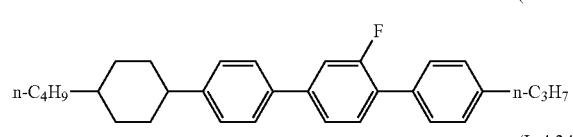
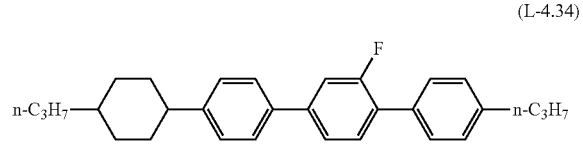

Moreover, the compound represented by General Formula (L-4) is preferably any of compounds represented by Formulae (L-4.41) to (L-4.44), and also preferably the compound represented by Formula (L-4.41) and/or the compound represented by Formula (L-4.42).

[Chem. 41]

(L-4.41)

(L-4.42)

(L-4.43)

(L-4.44)
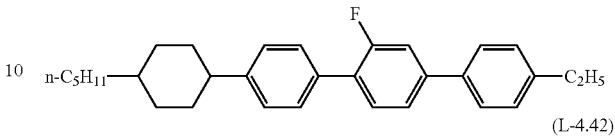
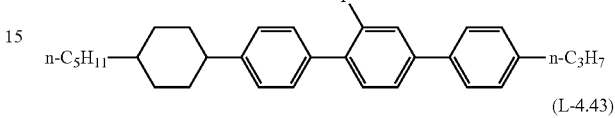
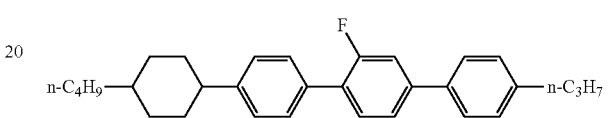
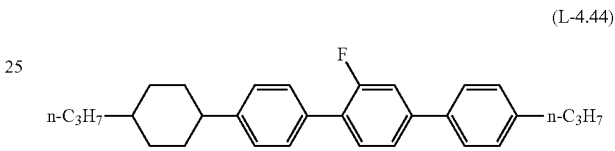

The liquid crystal composition of the present invention contains a third component that is at least one compound selected from the group consisting of compounds represented by General Formulae (N-1) to (N-3). These compounds are dielectrically negative compounds (negative Δε with an absolute value of greater than two).

[Chem. 42]

(N-1)

(N-2)

(N-3)
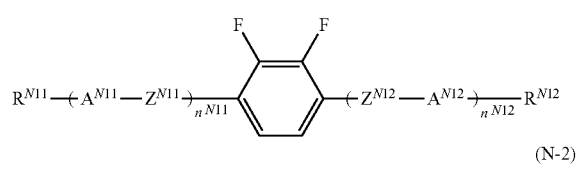
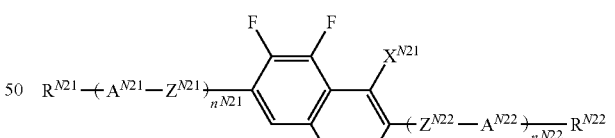
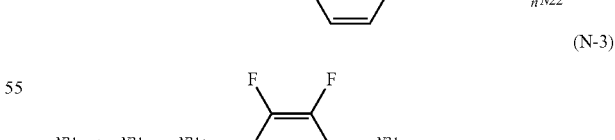

(in the formula, $R^{N11}$, $R^{N12}$, $R^{N21}$, $R^{N22}$, $R^{N31}$, and $R^{N32}$ each independently represent an alkyl group having 1 to 8 carbon atoms; in the alkyl group, one —$CH_2$— or two or more —$CH_2$—'s not adjoining each other are each independently optionally substituted with —CH=CH—, —C≡C—, —O—, —CO—, —COO—, or —OCO—;

$A^{N11}$, $A^{N12}$, $A^{N21}$, $A^{N22}$, $A^{N31}$, and $A^{N32}$ each independently represent a group selected from the group consisting of (a) a 1,4-cyclohexylene group (in which one —$CH_2$— or two or more —$CH_2$—'s not adjoining each other are each optionally substituted with —O—), (b) a 1,4-phenylene group (in which one —CH= or two or more —CH='s not adjoining each other are each optionally substituted with —N=), and (c) (c) a naphthalene-2,6-diyl group, a 1,2,3,4-tetrahydronaphthalene-2,6-diyl group, or a decahydronaphthalene-2,6-diyl group (in the naphthalene-2,6-diyl group or the 1,2,3,4-tetrahydronaphthalene-2,6-diyl group, one —CH= or two or more —CH='s not adjoining each other are each optionally substituted with —N=);

the groups (a) to (c) are each independently optionally substituted with a cyano group, a fluorine atom, or a chlorine atom;

$Z^{N11}$, $Z^{N12}$, $Z^{N21}$, $Z^{N22}$, $Z^{N31}$, and $Z^{N32}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

$X^{N21}$ represents a hydrogen atom or a fluorine atom;

$T^{N31}$ represents —$CH_2$— or an oxygen atom;

$n^{N11}$, $n^{N12}$, $n^{N21}$, $n^{N22}$, $n^{N31}$, and $n^{N32}$ each independently represent an integer from 0 to 3; $n^{N11}+n^{N12}$, $n^{N21}+n^{N22}$, and $n^{N31}+n^{N32}$ are each independently 1, 2, or 3; in the case where $A^{N11}$ to $A^{N32}$ and $Z^{N11}$ to $Z^{N32}$ are multiple, the corresponding ones of them may be the same as or different from each other)

The compounds represented by General Formulae (N-1) to (N-3) are preferably compounds each having a negative Δε with an absolute value of greater than three.

$R^{N11}$, $R^{N12}$, $R^{N21}$, $R^{N22}$, $R^{N31}$, and $R^{N32}$ in General Formulae (N-1) to (N-3) are each independently preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; also preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms; more preferably an alkyl group having 1 to 5 carbon atoms or an alkenyl group having 2 to 5 carbon atoms; further preferably an alkyl group having 2 to 5 carbon atoms or an alkenyl group having 2 or 3 carbon atoms; and especially preferably an alkenyl group having 3 carbon atoms (propenyl group).

In the case where the ring structures bonded to $R^{N11}$, $R^{N12}$, $R^{N21}$, $R^{N22}$, $R^{N31}$, and $R^{N32}$ are phenyl groups (aromatics), $R^{N11}$, $R^{N12}$, $R^{N21}$, $R^{N22}$, $R^{N31}$, and $R^{N32}$ are each preferably a linear alkyl group having 1 to 5 carbon atoms, a linear alkoxy group having 1 to 4 carbon atoms, or an alkenyl group having 4 or 5 carbon atoms; in the case where the ring structures bonded to them are saturated rings such as cyclohexane, pyran, and dioxane, they are each preferably a linear alkyl group having 1 to 5 carbon atoms, a linear alkoxy group having 1 to 4 carbon atoms, or a linear alkenyl group having 2 to 5 carbon atoms. In order to produce a stable nematic phase, the total of carbon atoms or, if any, oxygen atoms is preferably not more than five, and $R^{N11}$, $R^{N12}$, $R^{N21}$, $R^{N22}$, $R^{N31}$, and $R^{N32}$ are preferably linear.

The alkenyl group is preferably any group selected from groups represented by Formulae (R1) to (R5) (the black point in each of the formulae represents the carbon atom in the ring structure).

[Chem. 43]

(R1)

(R2)

(R3)

(R4)

(R5)

$A^{N11}$, $A^{N12}$, $A^{N21}$, $A^{N22}$, $A^{N31}$, and $A^{N32}$ are each independently preferably aromatic for large Δn or aliphatic for an improvement in the response speed. They are each independently preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; more preferably any of the following structures; and

[Chem. 44]

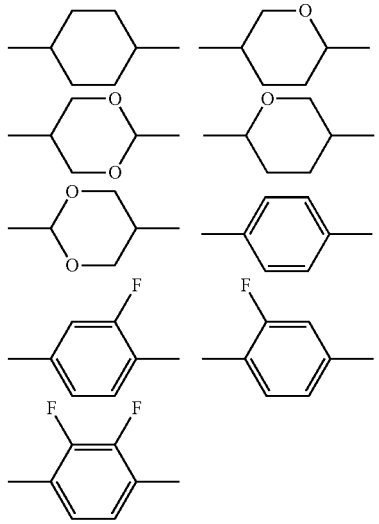

further preferably a trans-1,4-cyclohexylene group or a 1,4-phenylene group.

$Z^{N11}$, $Z^{N12}$, $Z^{N21}$, $Z^{N22}$, $Z^{N31}$, and $Z^{N32}$ each independently preferably represent —$CH_2O$—, —$CF_2O$—, —$CH_2CH_2$—, —$CF_2CF_2$—, or a single bond; more preferably —$CH_2O$—, —$CH_2CH_2$—, or a single bond; and especially preferably —$CH_2O$— or a single bond.

$X^{N21}$ represents a fluorine atom.

$T^{N31}$ represents an oxygen atom.

$n^{N11}+n^{N12}$, $n^{N21}+n^{N22}$, and $n^{N31}+n^{N32}$ are each preferably 1 or 2; and preferred combinations are as follows: $n^{N11}$ of 1 and $n^{N12}$ of 0, $n^{N11}$ of 2 and $n^{N12}$ of 0, $n^{N11}$ of 1 and $n^{N12}$ of 1, $n^{N11}$ of 2 and $n^{N12}$ of 1, $n^{N21}$ of 1 and $n^{N22}$ of 0, $n^{N21}$ of 2 and $n^{N22}$ of 0, $n^{N31}$ of 1 and $n^{N32}$ of 0, and $n^{N31}$ of 2 and $n^{N32}$ of 0.

The lower limit of the preferred amount of the compound represented by General Formula (N-1) is 1 mass %, 10 mass %, 20 mass %, 30 mass %, 40 mass %, 50 mass %, 55 mass %, 60 mass %, 65 mass %, 70 mass %, 75 mass %, or 80 mass % relative to the amount of the whole composition of the present invention. The upper limit of the preferred amount is 95 mass %, 85 mass %, 75 mass %, 65 mass %, 55 mass %, 45 mass %, 35 mass %, 25 mass %, or 20 mass %.

The lower limit of the preferred amount of the compound represented by General Formula (N-2) is 1 mass %, 10 mass %, 20 mass %, 30 mass %, 40 mass %, 50 mass %, 55 mass %, 60 mass %, 65 mass %, 70 mass %, 75 mass %, or 80 mass % relative to the amount of the whole composition of the present invention. The upper limit of the preferred amount is 95 mass %, 85 mass %, 75 mass %, 65 mass %, 55 mass %, 45 mass %, 35 mass %, 25 mass %, or 20 mass %.

The lower limit of the preferred amount of the compound represented by General Formula (N-3) is 1 mass %, 10 mass %, 20 mass %, 30 mass %, 40 mass %, 50 mass %, 55 mass %, 60 mass %, 65 mass %, 70 mass %, 75 mass %, or 80 mass % relative to the amount of the whole composition of the present invention. The upper limit of the preferred amount is 95 mass %, 85 mass %, 75 mass %, 65 mass %, 55 mass %, 45 mass %, 35 mass %, 25 mass %, or 20 mass %.

In the case where the composition of the present invention needs to have a viscosity kept at a low level to contribute to a high response speed, it is preferred that the above-mentioned lower limit be low and that the upper limit be low. In the case where the composition of the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (N-1) is preferably a compound selected from the group consisting of compounds represented by General Formulae (N-1-1) to (N-1-6) and (N-1-10) to (N-1-20).

The compound represented by General Formula (N-1-1) is as follows.

[Chem. 45]

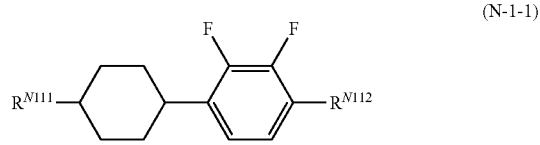

(N-1-1)

(in the formula, $R^{N111}$ and $R^{N112}$ independently have the same meanings as $R^{N11}$ and $R^{N12}$ in General Formula (N-1), respectively)

$R^{N111}$ is preferably an alkyl group having 1 to 5 carbon atoms or an alkenyl group having 2 to 5 carbon atoms, and also preferably a propyl group or a pentyl group. $R^{N112}$ is preferably an alkyl group having 1 to 5 carbon atoms, an alkenyl group having 4 or 5 carbon atoms, or an alkoxy group having 1 to 4 carbon atoms, and also preferably an ethoxy group or a butoxy group.

The compounds represented by General Formula (N-1-1) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in $\Delta\epsilon$, the amount is preferably adjusted to be larger; in terms of solubility at low temperature, the amount is adjusted to be larger to produce a greater effect; in terms of $T_{NI}$, the amount is adjusted to be smaller to produce a greater effect. In order to improve properties related to droplet stains and image-sticking, the range of the amount is preferably adjusted to be intermediate.

The lower limit of the preferred amount of the compound represented by Formula (N-1-1) is 5 mass %, 10 mass %, 13 mass %, 15 mass %, 17 mass %, 20 mass %, 23 mass %, 25 mass %, 27 mass %, 30 mass %, 33 mass %, or 35 mass % relative to the amount of the whole composition of the present invention. The upper limit of the preferred amount is 50 mass %, 40 mass %, 38 mass %, 35 mass %, 33 mass %, 30 mass %, 28 mass %, 25 mass %, 23 mass %, 20 mass %, 18 mass %, 15 mass %, 13 mass %, 10 mass %, 8 mass %, 7 mass %, 6 mass %, 5 mass %, or 3 mass % relative to the amount of the whole composition of the present invention.

The compound represented by General Formula (N-1-1) is preferably a compound selected from the group consisting of compounds represented by Formulae (N-1-1.1) to (N-1-1.8), also preferably any of the compounds represented by Formulae (N-1-1.1) to (N-1-1.4), and also preferably any of the compounds represented by Formulae (N-1-1.1) and (N-1-1.3).

[Chem. 46]

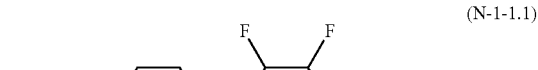
(N-1-1.1)

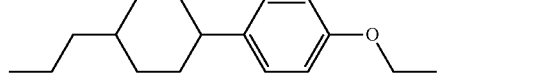
(N-1-1.2)

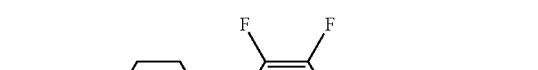

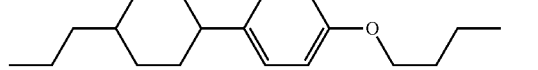
(N-1-1.3)

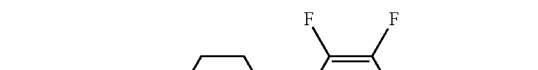

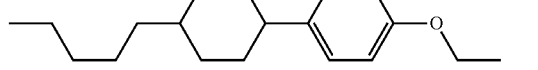
(N-1-1.4)

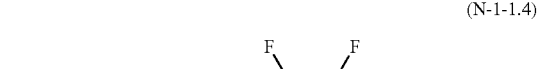

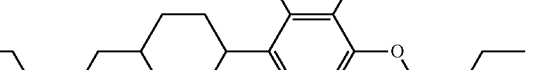

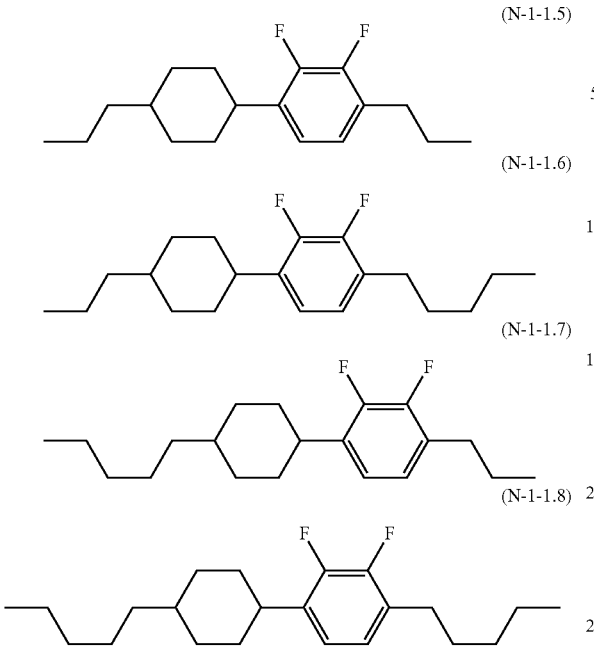

(N-1-1.5)

(N-1-1.6)

(N-1-1.7)

(N-1-1.8)

The compounds represented by Formulae (N-1-1.1) to (N-1-1.4) may be used alone or in combination. The lower limit of the preferred amount of any one or combination of the compounds is 5 mass %, 10 mass %, 13 mass %, 15 mass %, 17 mass %, 20 mass %, 23 mass %, 25 mass %, 27 mass %, 30 mass %, 33 mass %, or 35 mass % relative to the amount of the whole composition of the present invention. The upper limit of the preferred amount is 50 mass %, 40 mass %, 38 mass %, 35 mass %, 33 mass %, 30 mass %, 28 mass %, 25 mass %, 23 mass %, 20 mass %, 18 mass %, 15 mass %, 13 mass %, 10 mass %, 8 mass %, 7 mass %, 6 mass %, 5 mass %, or 3 mass % relative to the amount of the whole composition of the present invention.

The compound represented by General Formula (N-1-2) is as follows.

[Chem. 47]

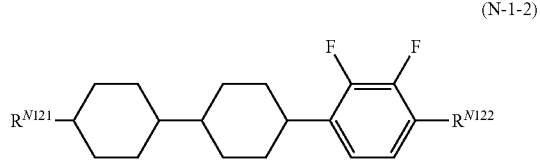

(N-1-2)

(in the formula, $R^{N121}$ and $R^{N122}$ independently have the same meanings as $R^{N11}$ and $R^{N12}$ in General Formula (N-1), respectively)

$R^{N121}$ is preferably an alkyl group having 1 to 5 carbon atoms or an alkenyl group having 2 to 5 carbon atoms, and also preferably an ethyl group, a propyl group, a butyl group, or a pentyl group. $R^{N122}$ is preferably an alkyl group having 1 to 5 carbon atoms, an alkenyl group having 4 or 5 carbon atoms, or an alkoxy group having 1 to 4 carbon atoms; and also preferably a methyl group, a propyl group, a methoxy group, an ethoxy group, or a propoxy group.

The compounds represented by General Formula (N-1-2) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be smaller to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-2) is 5 mass %, 7 mass %, 10 mass %, 13 mass %, 15 mass %, 17 mass %, 20 mass %, 23 mass %, 25 mass %, 27 mass %, 30 mass %, 33 mass %, 35 mass %, 37 mass %, 40 mass %, or 42 mass % relative to the amount of the whole composition of the present invention. The upper limit of the preferred amount is 50 mass %, 48 mass %, 45 mass %, 43 mass %, 40 mass %, 38 mass %, 35 mass %, 33 mass %, 30 mass %, 28 mass %, 25 mass %, 23 mass %, 20 mass %, 18 mass %, 15 mass %, 13 mass %, 10 mass %, 8 mass %, 7 mass %, 6 mass %, or 5 mass % relative to the amount of the whole composition of the present invention.

The compound represented by General Formula (N-1-2) is preferably a compound selected from the group consisting of compounds represented by Formulae (N-1-2.1) to (N-1-2.13), and also preferably any of the compounds represented by Formulae (N-1-2.3) to (N-1-2.7), (N-1-2.10), (N-1-2.11), and (N-1-2.13). In terms of an improvement in Δε, the compounds represented by Formulae (N-1-2.3) to (N-1-2.7) are preferred; and in terms of an improvement in $T_{NI}$, the compounds represented by Formulae (N-1-2.10), (N-1-2.11), and (N-1-2.13) are preferred.

[Chem. 48]

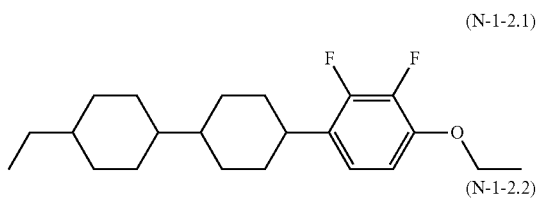

(N-1-2.1)

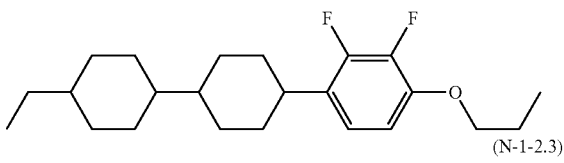

(N-1-2.2)

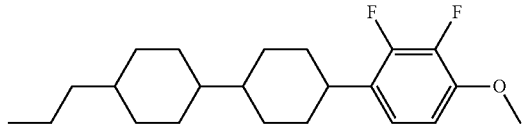

(N-1-2.3)

-continued

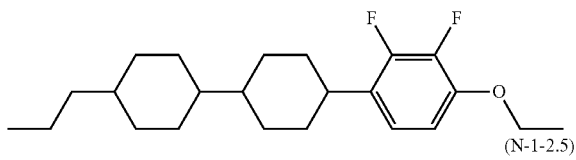
(N-1-2.4)

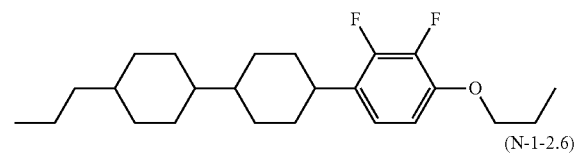
(N-1-2.5)

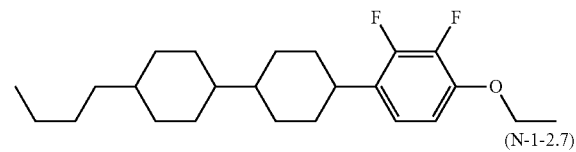
(N-1-2.6)

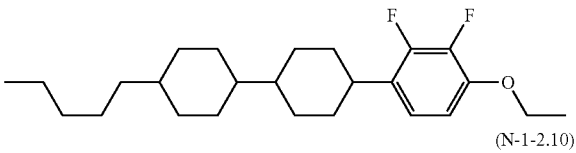
(N-1-2.7)

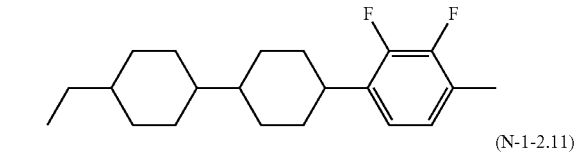
(N-1-2.10)

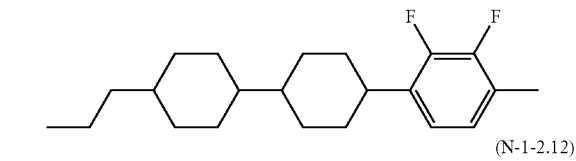
(N-1-2.11)

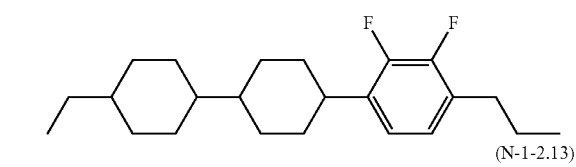
(N-1-2.12)

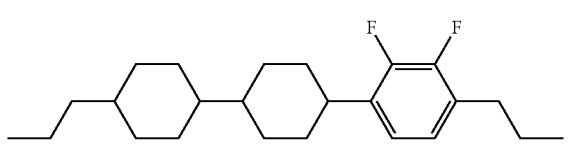
(N-1-2.13)

The compounds represented by Formulae (N-1-2.1) to (N-1-2.13) may be used alone or in combination. The lower limit of the preferred amount of any one or combination of the compounds is 5 mass %, 10 mass %, 13 mass %, 15 mass %, 17 mass %, 20 mass %, 23 mass %, 25 mass %, 27 mass %, 30 mass %, 33 mass %, or 35 mass % relative to the amount of the whole composition of the present invention. The upper limit of the preferred amount is 50 mass %, 40 mass %, 38 mass %, 35 mass %, 33 mass %, 30 mass %, 28 mass %, 25 mass %, 23 mass %, 20 mass %, 18 mass %, 15 mass %, 13 mass %, 10 mass %, 8 mass %, 7 mass %, 6 mass %, 5 mass %, or 3 mass % relative to the amount of the whole composition of the present invention.

The compound represented by General Formula (N-1-3) is as follows.

[Chem. 49]

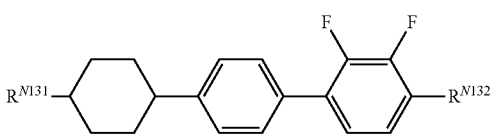
(N-1-3)

(in the formula, $R^{N131}$ and $R^{N132}$ independently have the same meanings as $R^{N11}$ and $R^{N12}$ in General Formula (N-1), respectively)

$R^{N131}$ is preferably an alkyl group having 1 to 5 carbon atoms or an alkenyl group having 2 to 5 carbon atoms, and also preferably an ethyl group, a propyl group, or a butyl group. $R^{N132}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-3) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-3) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-3) is preferably a compound selected from the group consisting of compounds represented by Formulae (N-1-3.1) to (N-1-3.9), also preferably any of the compounds represented by Formulae (N-1-3.1) to (N-1-3.7), and also preferably any of the compounds represented by Formulae (N-1-3.1), (N-1-3.2), (N-1-3.3), (N-1-3.4), (N-1-3.6).

[Chem. 50]

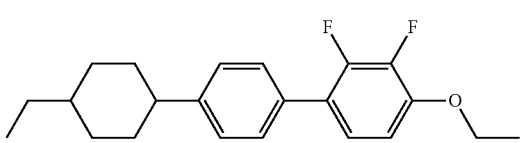
(N-1-3.1)

-continued

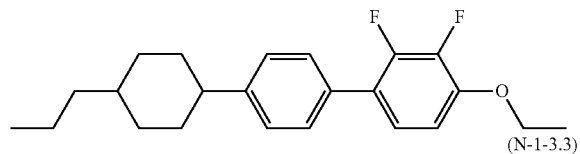
(N-1-3.2)

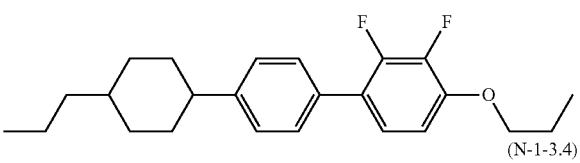
(N-1-3.3)

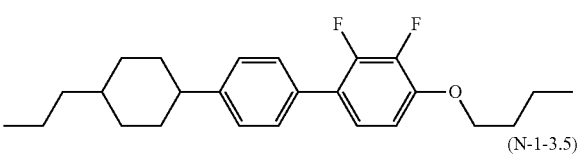
(N-1-3.4)

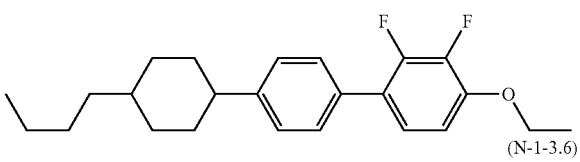
(N-1-3.5)

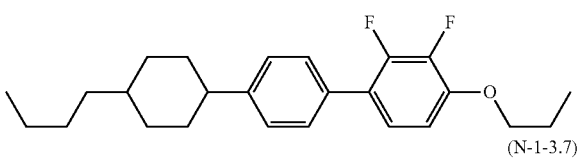
(N-1-3.6)

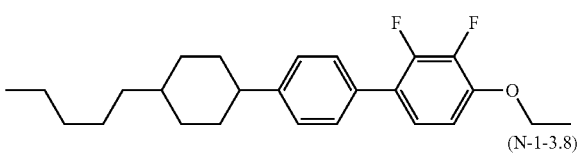
(N-1-3.7)

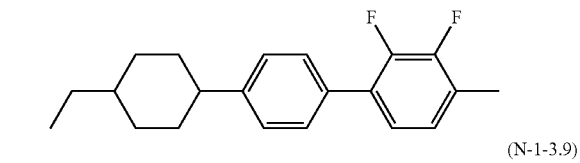
(N-1-3.8)

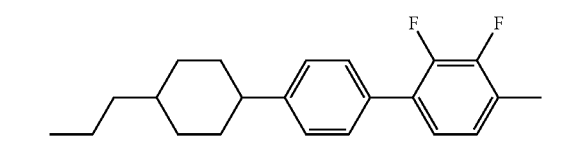
(N-1-3.9)

The compounds represented by Formulae (N-1-3.1) to (N-1-3.4) and (N-1-3.6) may be used alone or in combination; a combination of the compounds represented by Formulae (N-1-3.1) and (N-1-3.2) and a combination of two or three compounds selected from the compounds represented by Formulae (N-1-3.3), (N-1-3.4), and (N-1-3.6) are preferred.

The lower limit of the preferred amount of any one or combination of the compounds is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-4) is as follows.

[Chem. 51]

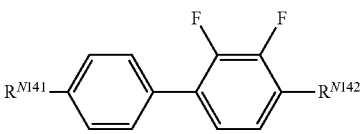
(N-1-4)

(in the formula, $R^{N141}$ and $R^{N142}$ independently have the same meanings as $R^{N11}$ and $R^{N12}$ in General Formula (N-1), respectively)

$R^{N141}$ and $R^{N142}$ are each independently preferably an alkyl group having 1 to 5 carbon atoms, an alkenyl group having 4 or 5 carbon atoms, or an alkoxy group having 1 to 4 carbon atoms; and also preferably a methyl group, a propyl group, an ethoxy group, or a butoxy group.

The compounds represented by General Formula (N-1-4) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be smaller to produce a greater effect. In order to improve properties related to droplet stains and image-sticking, the range of the amount is preferably adjusted to be intermediate.

The lower limit of the preferred amount of the compound represented by Formula (N-1-4) is 3 mass %, 5 mass %, 7 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, 13 mass %, 11 mass %, 10 mass %, or 8 mass % relative to the amount of the whole composition of the present invention.

The compound represented by General Formula (N-1-4) is preferably a compound selected from the group consisting of compounds represented by Formulae (N-1-4.1) to (N-1-4.8), also preferably any of the compounds represented by Formulae (N-1-4.1) to (N-1-4.4), and also preferably any of the compounds represented by Formulae (N-1-4.1) and (N-1-4.2).

[Chem. 52]

(N-1-4.1)

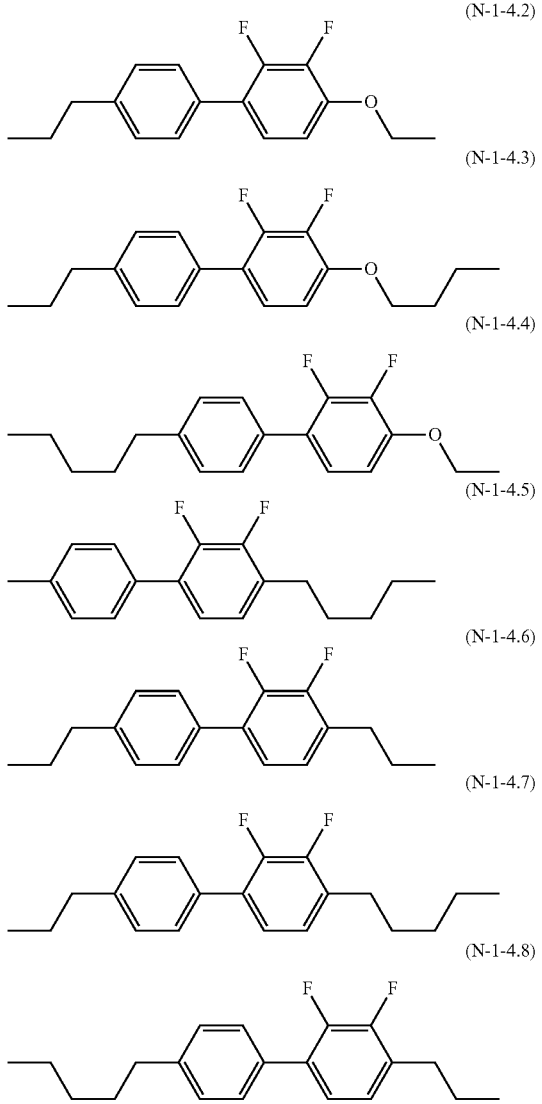

The compounds represented by Formulae (N-1-4.1) to (N-1-4.4) may be used alone or in combination. The lower limit of the preferred amount of any one or combination of the compounds is 3 mass %, 5 mass %, 7 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, 13 mass %, 11 mass %, 10 mass %, or 8 mass % relative to the amount of the whole composition of the present invention.

The compound represented by General Formula (N-1-5) is as follows.

[Chem. 53]

(N-1-5)

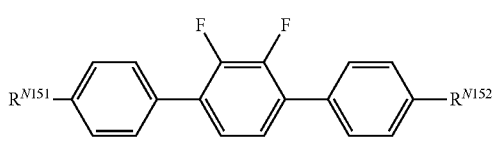

(in the formula, $R^{N151}$ and $R^{N152}$ independently have the same meanings as $R^{N11}$ and $R^{N12}$ in General Formula (N-1), respectively)

$R^{N151}$ and $R^{N152}$ are each independently preferably an alkyl group having 1 to 5 carbon atoms, an alkenyl group having 4 or 5 carbon atoms, or an alkoxy group having 1 to 4 carbon atoms; and also preferably an ethyl group, a propyl group, or a butyl group.

The compounds represented by General Formula (N-1-5) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be smaller to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-5) is 5 mass %, 8 mass %, 10 mass %, 13 mass %, 15 mass %, 17 mass %, or 20 mass % relative to the amount of the whole composition of the present invention. The upper limit of the preferred amount is 35 mass %, 33 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-5) is preferably a compound selected from the group consisting of compounds represented by Formulae (N-1-5.1) to (N-1-5.6), and also preferably any of the compounds represented by Formulae (N-1-5.2) and (N-1-5.4).

[Chem. 54]

(N-1-5.1)

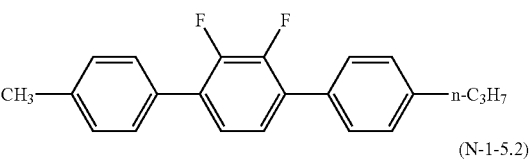

(N-1-5.2)

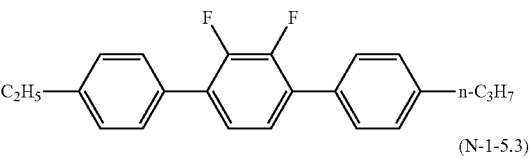

(N-1-5.3)

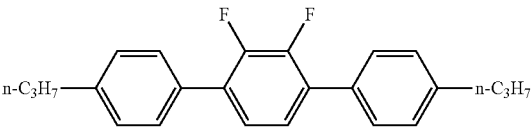

-continued (N-1-5.4)
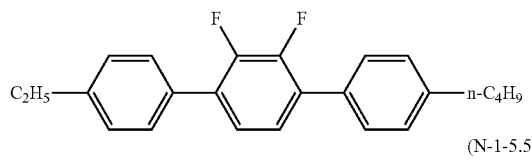

(N-1-5.5)
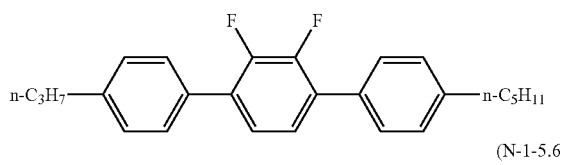

(N-1-5.6)
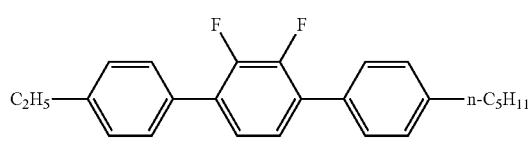

The compounds represented by Formulae (N-1-5.2) and (N-1-5.4) may be used alone or in combination. The lower limit of the preferred amount of any one or combination of the compounds is 5 mass %, 8 mass %, 10 mass %, 13 mass %, 15 mass %, 17 mass %, or 20 mass % relative to the amount of the whole composition of the present invention. The upper limit of the preferred amount is 35 mass %, 33 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-6) is as follows.

[Chem. 55]

(N-1-6)
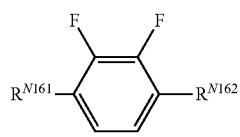

(in the formula, $R^{N161}$ and $R^{N162}$ independently have the same meanings as $R^{N11}$ and $R^{N12}$ in General Formula (N-1), respectively)

The compound represented by General Formula (N-1-6) is preferably any of compounds represented by General Formulae (N-1-6-1) to (N-1-6-14).

[Chem. 56]

(N-1-6-1)
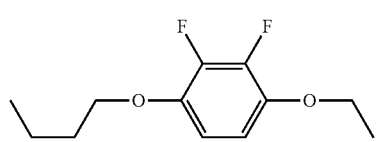

(N-1-6-2)
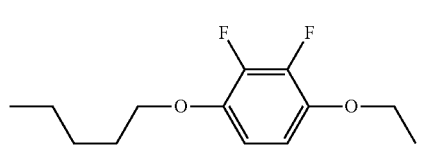

-continued (N-1-6-3)
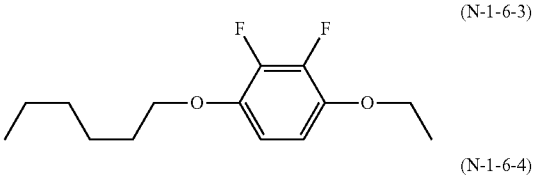

(N-1-6-4)
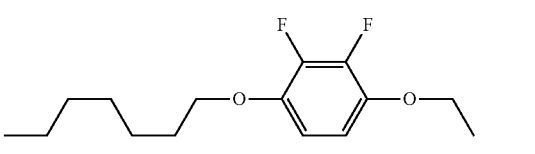

(N-1-6-5)
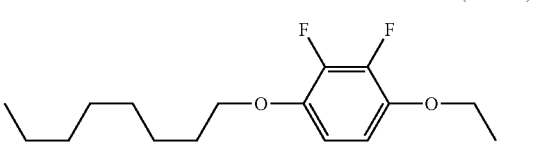

(N-1-6-6)
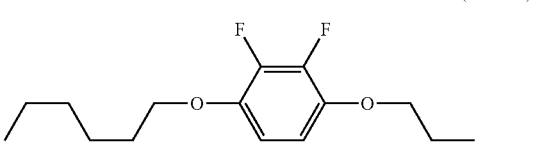

(N-1-6-7)
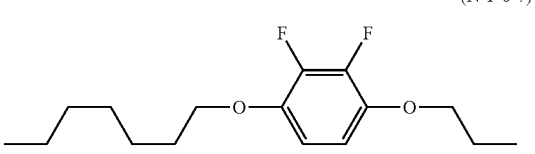

(N-1-6-8)
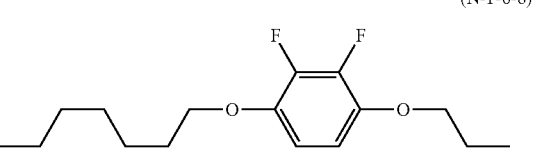

(N-1-6-9)
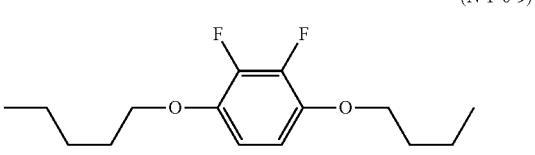

(N-1-6-10)
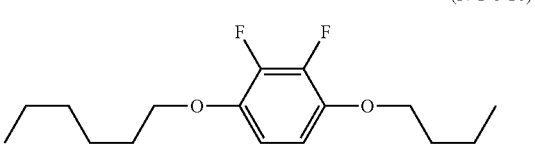

(N-1-6-11)
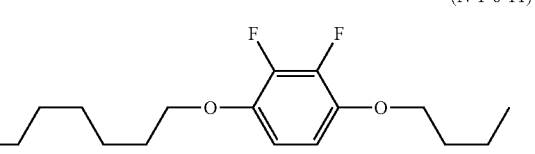

(N-1-6-12)
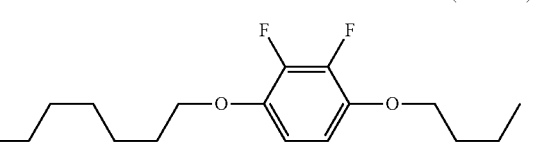

-continued (N-1-6-13)

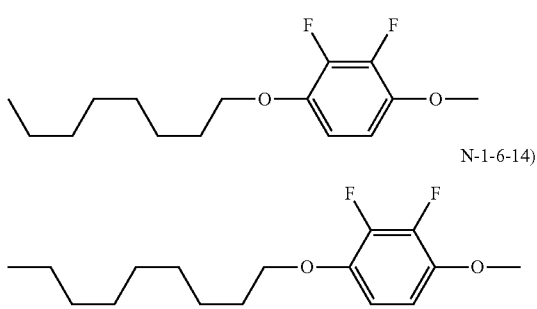

(N-1-6-14)

The lower limit of the amount of the compound represented by General Formula (N-1-6) in the liquid crystal composition of the present invention is preferably 1 mass %, and more preferably 2 mass %; the upper limit thereof is preferably 15 mass %, more preferably 12 mass %, further preferably 10 mass %, especially preferably 8 mass %, and most preferably 7 mass %.

The compound represented by General Formula (N-1-10) is as follows.

[Chem. 57]

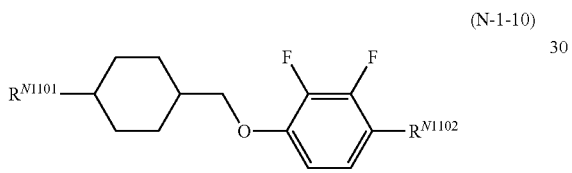

(N-1-10)

(in the formula, $R^{N1101}$ and $R^{N1102}$ independently have the same meanings as $R^{N11}$ and $R^{N12}$ in General Formula (N-1), respectively)

$R^{N1101}$ is preferably an alkyl group having 1 to 5 carbon atoms or an alkenyl group having 2 to 5 carbon atoms, and also preferably an ethyl group, a propyl group, or a butyl group. $R^{N1102}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-10) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-10) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-10) is preferably a compound selected from the group consisting of compounds represented by Formulae (N-1-10.1) to (N-1-10.10), also preferably any of the compounds represented by Formulae (N-1-10.1) to (N-1-10.5), and also preferably any of the compounds represented by Formulae (N-1-10.1) and (N-1-10.2).

[Chem. 58]

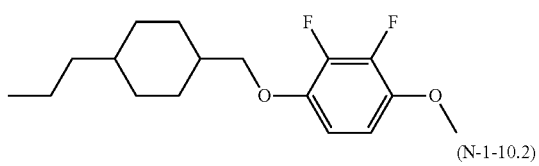

(N-1-10.1)

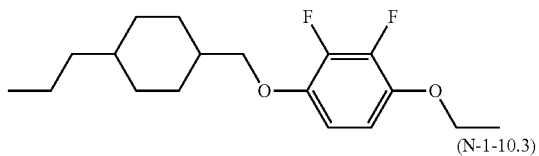

(N-1-10.2)

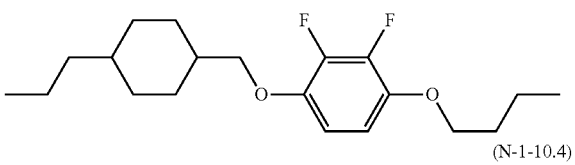

(N-1-10.3)

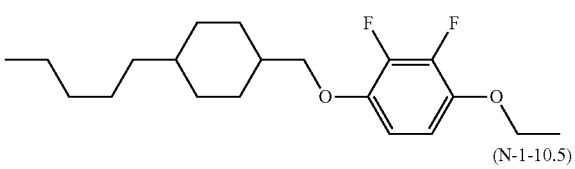

(N-1-10.4)

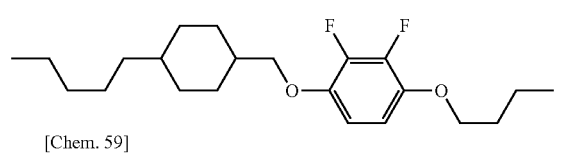

(N-1-10.5)

[Chem. 59]

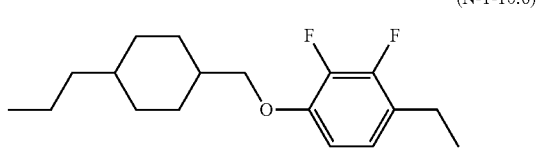

(N-1-10.6)

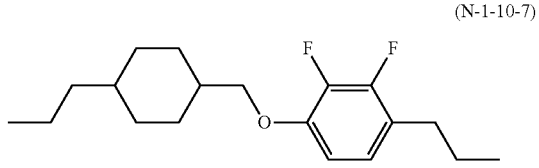

(N-1-10-7)

-continued

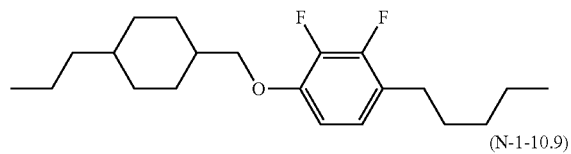
(N-1-10.8)

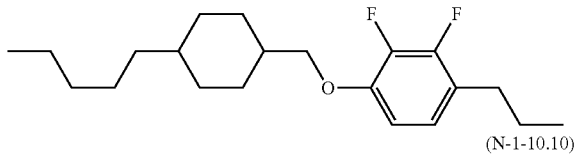
(N-1-10.9)

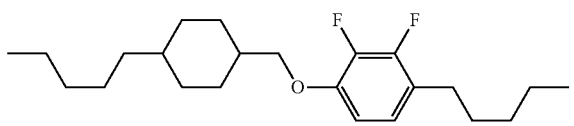
(N-1-10.10)

The compounds represented by Formulae (N-1-10.1) and (N-1-10.2) may be used alone or in combination. The lower limit of the preferred amount of any one or combination of the compounds is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-11) is as follows.

[Chem. 60]

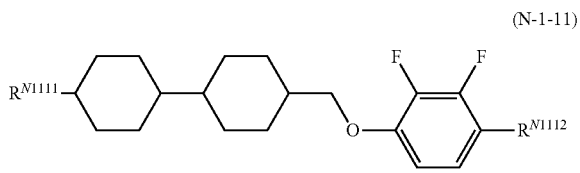
(N-1-11)

(in the formula, $R^{N1111}$ and $R^{N1112}$ independently have the same meanings as $R^{N11}$ and $R^{N12}$ in General Formula (N-1), respectively)

$R^{N1111}$ is preferably an alkyl group having 1 to 5 carbon atoms or an alkenyl group having 2 to 5 carbon atoms, and also preferably an ethyl group, a propyl group, or a butyl group. $R^{N1112}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-11) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-11) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-11) is preferably a compound selected from the group consisting of compounds represented by Formulae (N-1-11.1) to (N-1-11.10), also preferably any of the compounds represented by Formulae (N-1-11.1) to (N-1-11.5), and also preferably any of the compounds represented by Formulae (N-1-11.2 and (N-1-11.4).

[Chem. 61]

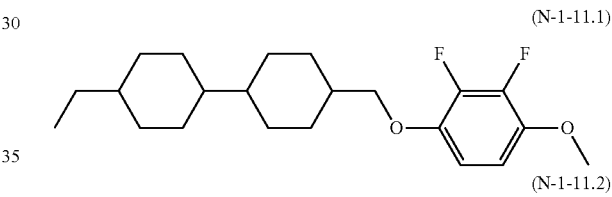
(N-1-11.1)

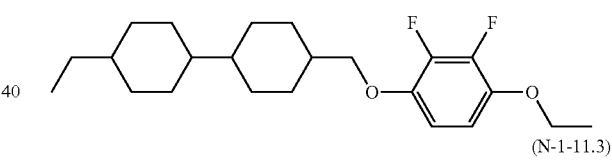
(N-1-11.2)

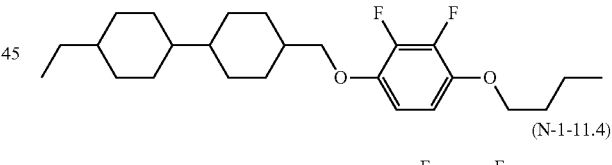
(N-1-11.3)

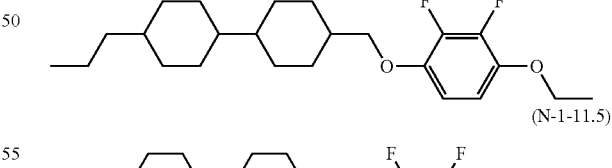
(N-1-11.4)

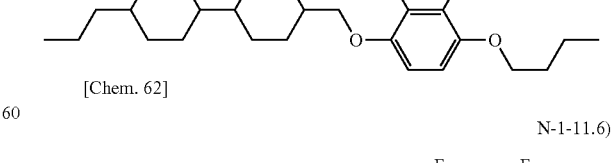
(N-1-11.5)

[Chem. 62]

N-1-11.6)

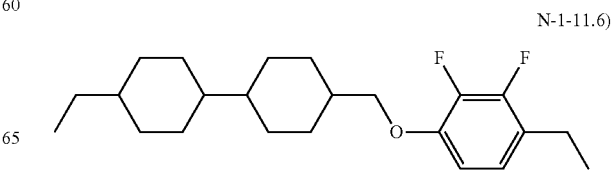

-continued

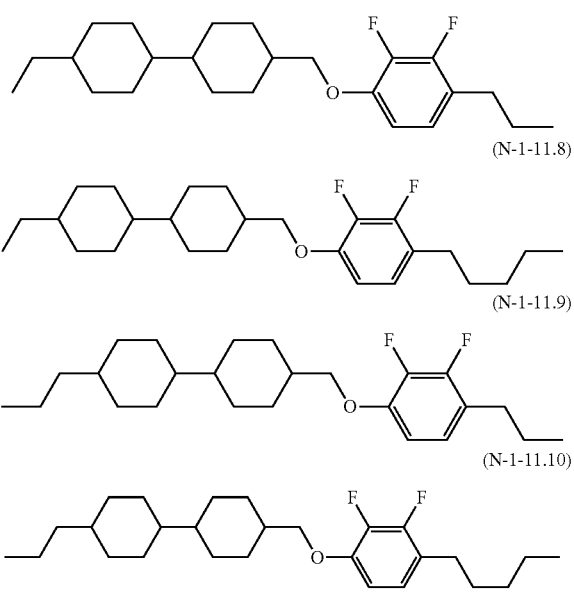

(N-1-11.7)

(N-1-11.8)

(N-1-11.9)

(N-1-11.10)

The compounds represented by Formulae (N-1-11.2) and (N-1-11.4) may be used alone or in combination. The lower limit of the preferred amount of any one or combination of the compounds is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-12) is as follows.

[Chem. 63]

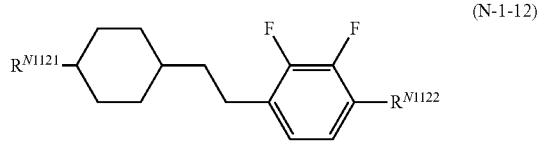

(N-1-12)

(in the formula, $R^{N1121}$ and $R^{N1122}$ independently have the same meanings as $R^{N11}$ and $R^{N12}$ in General Formula (N-1), respectively)

$R^{N1121}$ is preferably an alkyl group having 1 to 5 carbon atoms or an alkenyl group having 2 to 5 carbon atoms, and also preferably an ethyl group, a propyl group, or a butyl group. $R^{N1122}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-12) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-12) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-13) is as follows.

[Chem. 64]

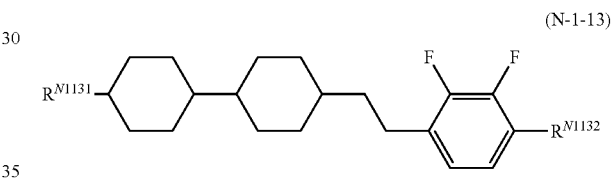

(N-1-13)

(in the formula, $R^{N1131}$ and $R^{N1132}$ independently have the same meanings as $R^{N11}$ and $R^{N12}$ in General Formula (N-1), respectively)

$R^{N1131}$ is preferably an alkyl group having 1 to 5 carbon atoms or an alkenyl group having 2 to 5 carbon atoms, and also preferably an ethyl group, a propyl group, or a butyl group. $R^{N1132}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-13) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-13) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-14) is as follows.

[Chem. 65]

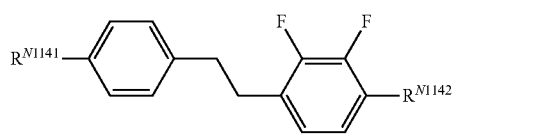

(N-1-14)

(in the formula, $R^{N1141}$ and $R^{N1142}$ independently have the same meanings as $R^{N11}$ and $R^{N12}$ in General Formula (N-1), respectively)

$R^{N1141}$ is preferably an alkyl group having 1 to 5 carbon atoms or an alkenyl group having 2 to 5 carbon atoms, and also preferably an ethyl group, a propyl group, or a butyl group. $R^{N1142}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-14) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-14) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-15) is as follows.

[Chem. 66]

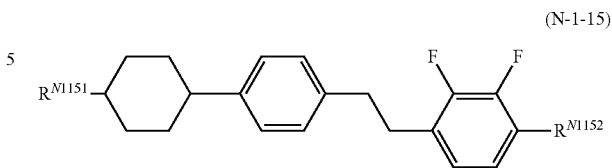

(N-1-15)

(in the formula, $R^{N1151}$ and $R^{N1152}$ independently have the same meanings as $R^{N11}$ and $R^{N12}$ in General Formula (N), respectively)

$R^{N1151}$ is preferably an alkyl group having 1 to 5 carbon atoms or an alkenyl group having 2 to 5 carbon atoms, and also preferably an ethyl group, a propyl group, or a butyl group. $R^{N1152}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-15) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-15) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-16) is as follows.

[Chem. 67]

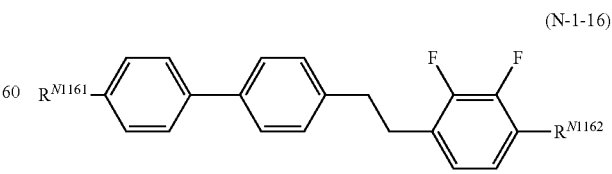

(N-1-16)

(in the formula, $R^{N1161}$ and $R^{N1162}$ independently have the same meanings as $R^{N11}$ and $R^{N12}$ in General Formula (N-1), respectively)

$R^{N1161}$ is preferably an alkyl group having 1 to 5 carbon atoms or an alkenyl group having 2 to 5 carbon atoms, and also preferably an ethyl group, a propyl group, or a butyl group. $R^{N1162}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-16) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-16) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-17) is as follows.

[Chem. 68]

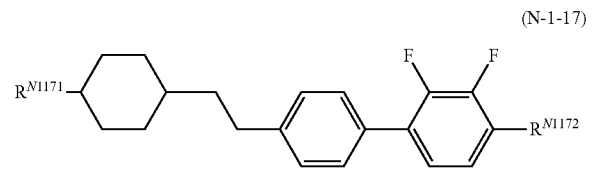

(N-1-17)

(in the formula, $R^{N1171}$ and $R^{N1172}$ independently have the same meanings as $R^{N11}$ and $R^{N12}$ in General Formula (N-1), respectively)

$R^{N1171}$ is preferably an alkyl group having 1 to 5 carbon atoms or an alkenyl group having 2 to 5 carbon atoms, and also preferably an ethyl group, a propyl group, or a butyl group. $R^{N1172}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-17) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-17) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-18) is as follows.

[Chem. 69]

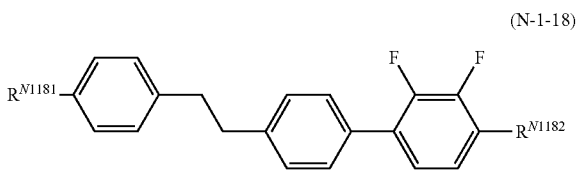

(N-1-18)

(in the formula, $R^{N1181}$ and $R^{N1182}$ independently have the same meanings as $R^{N11}$ and $R^{N12}$ in General Formula (N-1), respectively)

$R^{N1181}$ is preferably an alkyl group having 1 to 5 carbon atoms or an alkenyl group having 2 to 5 carbon atoms, and also preferably an ethyl group, a propyl group, or a butyl group. $R^{N1182}$ is preferably an alkyl group having 1 to 5 carbon atoms, an alkenyl group having 4 or 5 carbon atoms, or an alkoxy group having 1 to 4 carbon atoms; and also preferably an ethoxy group, a propoxy group, or a butoxy group.

The compounds represented by General Formula (N-1-18) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

In terms of an improvement in Δε, the amount is preferably adjusted to be larger; in terms of solubility at low temperature, the amount is adjusted to be larger to produce a greater effect; in terms of $T_{NI}$, the amount is adjusted to be larger to produce a greater effect. In order to improve properties related to droplet stains and image-sticking, the range of the amount is preferably adjusted to be intermediate.

The lower limit of the preferred amount of the compound represented by Formula (N-1-18) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-19) is as follows.

[Chem. 70]

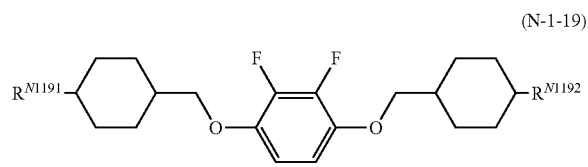

(N-1-19)

(in the formula, $R^{N1191}$ and $R^{N1192}$ independently have the same meanings as $R^{N11}$ and $R^{N12}$ in General Formula (N-1), respectively)

The compounds represented by General Formula (N-1-19) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The lower limit of the preferred amount of the compound represented by Formula (N-1-19) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-1-20) is as follows.

[Chem. 71]

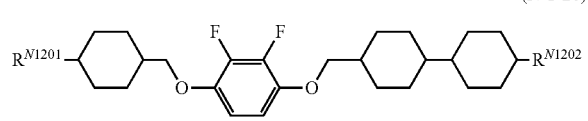

(N-1-20)

(in the formula, $R^{N1201}$ and $R^{N1202}$ independently have the same meanings as $R^{N11}$ and $R^{N12}$ in General Formula (N-1), respectively)

The compounds represented by General Formula (N-1-20) may be used alone or in combination. Such compounds can be used in any combination; a proper combination of the compounds is determined on the basis of the intended properties such as solubility at low temperature, transition temperature, electric reliability, and birefringence. For example, one of such compounds is used in an embodiment of the present invention, two of the compounds are used in another embodiment, three of the compounds are used in another embodiment, four of the compounds are used in another embodiment, and five or more of the compounds are used in another embodiment.

The lower limit of the preferred amount of the compound represented by Formula (N-1-20) is 5 mass %, 10 mass %, 13 mass %, 15 mass %, 17 mass %, or 20 mass % relative to the amount of the whole composition of the present invention. The upper limit of the preferred amount is 35 mass %, 30 mass %, 28 mass %, 25 mass %, 23 mass %, 20 mass %, 18 mass %, 15 mass %, or 13 mass % relative to the amount of the whole composition of the present invention.

The compound represented by General Formula (N-2) is preferably a compound selected from the group consisting of compounds represented by General Formulae (N-2-1) to (N-2-6).

[Chem. 72]

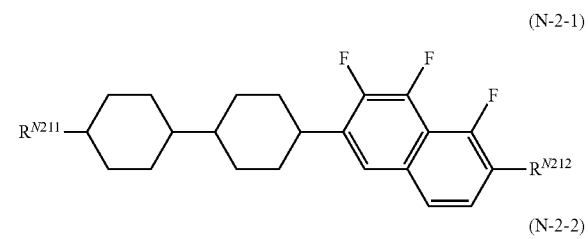

(N-2-1)

(N-2-2)

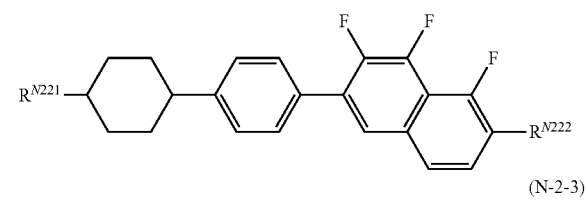

(N-2-3)

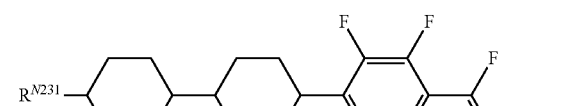

(N-2-4)

[Chem. 73]

(N-2-5)

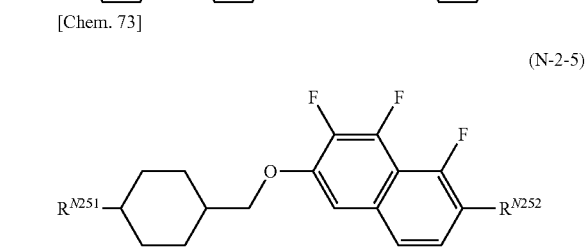

(N-2-6)

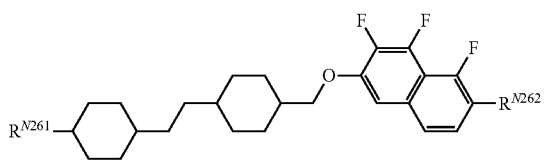

(in the formula, $R^{N211}$, $R^{N221}$, $R^{N231}$, $R^{N241}$, $R^{N251}$, and $R^{N261}$ each independently have the same meaning as $R^{N11}$ in General Formula (N); and $R^{N212}$, $R^{N222}$, $R^{N232}$, $R^{N242}$, $R^{N252}$, and $R^{N262}$ each independently have the same meaning as $R^{N12}$ in General Formula (N-2))

The compound represented by General Formula (N-3) is preferably a compound selected from the group consisting of compounds represented by General Formulae (N-3-1) to (N-3-4).

[Chem. 74]

(N-3-1)

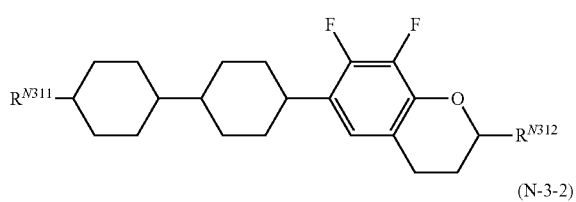

(N-3-2)

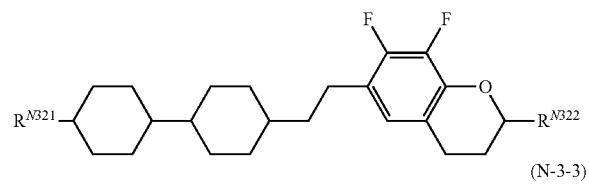

(N-3-3)

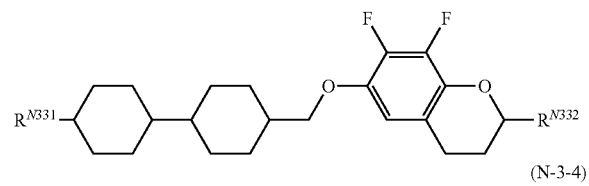

(N-3-4)

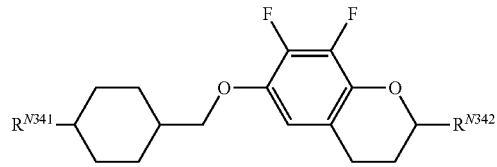

(in the formula, $R^{N311}$, $R^{N321}$, $R^{N331}$, and $R^{N341}$ each independently have the same meaning as $R^{N11}$ in General Formula (N-3); and $R^{N312}$, $R^{N322}$, $R^{N332}$, and $R^{N342}$ each independently have the same meaning as $R^{N12}$ in General Formula (N))

In the case where the liquid crystal composition of the present invention contains two or more of the compounds represented by General Formulae (N-1) to (N-3), two or more compounds represented by only any one of General Formulae (N-1) to (N-3) may be used, or two or more compounds represented by two or more of General Formulae (N-1) to (N-3) may be used.

The liquid crystal composition of the present invention preferably contains at least one of the compounds represented by General Formula (N-1); in particular, it preferably contains at least one of the compounds represented by General Formulae (N-1-1) to (N-1-5), (N-1-10), (N-1-11), and (N-1-19), more preferably two to ten thereof, and further preferably a combination of the compounds represented by General Formulae (N-1-1) to (N-1-5) or a combination of the compounds represented by General Formulae (N-1-10) to (N-1-11).

The total amount of the compounds represented by General Formulae (N-1), (N-2), and (N-3) are preferably in the range of 1 to 90 mass %, also preferably 10 to 90 mass %, more preferably 20 mass % to 80 mass %, further preferably 20 mass % to 70 mass %, still further preferably 20 mass % to 60 mass %, still further preferably 25 mass % to 60 mass %, and still further preferably 30 mass % to 60 mass %.

More specifically, the lower limit of the total amount of the compounds represented by General Formulae (N-1), (N-2), and (N-3) in the composition is preferably not less than 1 mass %, also preferably not less than 10 mass %, also preferably not less than 20 mass %, also preferably not less than 25 mass %, and also preferably not less than 30 mass %.

The upper limit thereof is preferably not more than 90 mass %, also preferably not more than 80 mass %, also preferably not more than 70 mass %, and also preferably not more than 60 mass %.

The composition of the present invention is preferably free from a compound having a molecular structure in which oxygen atoms are bonded to each other, such as the structure of a peroxy acid (—CO—OO—).

In terms of the reliability and long-term stability of the composition, the amount of a compound having a carbonyl group is preferably not more than 5 mass %, more preferably not more than 3 mass %, and further preferably not more than 1 mass % relative to the mass of the whole of the composition. It is most preferred that the composition be substantially free from such a compound.

In terms of stability to irradiation with UV, the amount of a compound substituted with a chlorine atom is preferably not more than 15 mass %, also preferably not more than 10 mass %, also preferably not more than 8 mass %, more preferably not more than 5 mass %, and further preferably 3 mass % relative to the mass of the whole of the composition. It is most preferred that the composition be substantially free from such a compound.

The amount of compounds having molecules in which all of the ring structures are six-membered rings is preferably adjusted to be large. The amount of such compounds having molecules in which all of the ring structures are six-membered rings is preferably not less than 80 mass %, more preferably not less than 90 mass %, and further preferably not less than 95 mass % relative to the mass of the whole of the composition. It is most preferred that the composition be substantially composed of only the compounds having molecules in which all of the ring structures are six-membered rings.

In order to suppress degradation of the composition due to the oxidation thereof, the amount of a compound having a cyclohexenylene group that is a ring structure is preferably reduced. The amount of a compound having a cyclohexenylene group is preferably not more than 10 mass %, also preferably not more than 8 mass %, more preferably not more than 5 mass %, and further preferably not more than 3 mass % relative to the mass of the whole of the composition. It is further preferred that the liquid crystal composition be substantially free from such a compound.

In terms of improvements in viscosity and Tni, the amount of a compound of which the molecules each contain a 2-methylbenzene-1,4-diyl group in which a hydrogen atom is optionally substituted with a halogen is preferably reduced. The amount of the compound of which the molecules each contain such a 2-methylbenzene-1,4-diyl group is preferably not more than 10 mass %, also preferably not more than 8 mass %, more preferably not more than 5 mass %, and further preferably not more than 3 mass % relative to the mass of the whole of the composition. It is further preferred that the composition be substantially free from such a compound.

The term "substantially free from such a compound" herein refers to that the composition does not contain such a compound except for the case where the compound is unavoidably contained.

The total amount of the compounds that are the second and third components of the liquid crystal composition of the present invention is preferably in the range of 80 mass % to 99.9 mass %, also preferably 85 mass % to 99.9 mass %, also preferably 90 mass % to 99.8 mass %, also preferably 90 mass % to 99.5 mass %, also preferably 92 mass % to 99.5 mass %, and also preferably 92 mass % to 99 mass % relative to the amount of the whole liquid crystal composition of the present invention.

In the case where a compound contained in the composition of the first embodiment of the present invention has a side chain that is an alkenyl group, the alkenyl group preferably has 2 to 5 carbon atoms if the alkenyl group is bonded to cyclohexane, or the alkenyl group preferably has 4 or 5 carbon atoms if the alkenyl group is bonded to benzene. The unsaturated bond of the alkenyl group is preferably not directly connected to the benzene.

The dielectric anisotropy Δε of the liquid crystal composition of the present invention is negative and has an absolute value of two or more. The dielectric anisotropy Δε at 25° C. is preferably in the range of −2.0 to −6.0, more preferably −2.5 to −5.0, and especially preferably −2.5 to −4.5. More specifically, the Δε is preferably from −2.5 to −3.4 in terms of response speed or from −3.4 to −4.5 in terms of a driving voltage.

The refractive index anisotropy Δn of the liquid crystal composition of the present invention at 25° C. is preferably from 0.08 to 0.13, and more preferably 0.09 to 0.12. More specifically, the refractive index anisotropy is preferably from 0.10 to 0.12 for a thin cell gap or from 0.08 to 0.10 for a thick cell gap.

The rotational viscosity ($\gamma_1$) of the liquid crystal composition of the present invention is preferably not more than 150, more preferably not more than 130, and especially preferably not more than 120.

In the liquid crystal composition of the present invention, it is preferred that the function Z of the rotational viscosity and the refractive index anisotropy have a specific value.

$$Z = \gamma_1 / \Delta n^2 \qquad \text{[Math. 1]}$$

(where $\gamma_1$ represents rotational viscosity, and $\Delta n$ represents refractive index anisotropy)

Z is preferably not more than 13000, more preferably not more than 12000, and especially preferably not more than 11000.

The nematic phase-isotropic liquid phase transition temperature ($T_{ni}$) of the liquid crystal composition of the present invention is not less than 60° C., preferably not less than 75° C., more preferably not less than 80° C., and further preferably not less than 90° C.

The liquid crystal composition of the present invention needs to have a specific resistance of not less than $10^{12}$ (Ω·m), preferably $10^{13}$ (Ω·m), and more preferably not less than $10^{14}$ (Ω·m).

The liquid crystal composition of the present invention may contain, depending on applications thereof, general nematic liquid crystal, smectic liquid crystal, cholesteric liquid crystal, antioxidant, and ultraviolet absorber in addition to the above-mentioned compounds. In the case where the liquid crystal composition needs to be chemically stable, it is preferred that the molecules thereof be free from a chlorine atom; in the case where the liquid crystal composition needs to be stable to light such as ultraviolet, it is preferred that the molecules thereof be free from a condensed ring having a long conjugation length and showing an absorption peak in an ultraviolet region, such as a naphthalene ring.

The liquid crystal composition of the present invention can contain a polymerizable compound for production of a liquid crystal display device of a PS mode, a PSA mode involving use of a horizontal electric field, or a PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which multiple six-membered rings are bonded to each other, such as biphenyl derivatives and terphenyl derivatives.

Specifically, the polymerizable compound to be used is preferably at least one polymerizable compound represented by General Formula (X).

[Chem. 75]

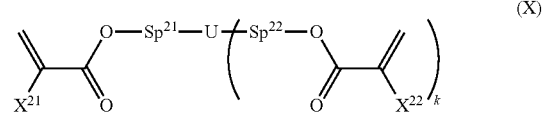

(in the formula, $X^{21}$ and $X^{22}$ each independently represent a hydrogen atom or a methyl group; $Sp^{21}$ and $Sp^{22}$ each independently represent a single bond, an alkylene group having 1 to 8 carbon atoms, or —Y—$(CH_2)_s$— (where s represents an integer from 2 to 7; Y represents O, OCOO, or COO; and Y is bonded to the aromatic ring of U)); U represents a linear or branched polyvalent alkylene group having 2 to 20 carbon atoms, a linear or branched polyvalent alkenylene group having 3 to 20 carbon atoms, or a polyvalent cyclic substituent having 5 to 30 carbon atoms; the alkylene group of the polyvalent alkylene group or the alkenylene group of the polyvalent alkenylene group is optionally substituted with —O—, —CO—, —$CF_2$—, an alkyl group having 5 to 20 carbon atoms (in which an alkylene group is optionally substituted with an oxygen atom provided that oxygen atoms do not adjoin each other), or a cyclic substituent provided that oxygen atoms do not adjoin each other; and k represents an integer from 1 to 5)

In General Formula (X), $X^{21}$ and $X^{22}$ each independently represent a hydrogen atom or a methyl group; in the case of focusing on the response speed, a hydrogen atom is preferred; and in the case of focusing on a reduction in the amount of the residue after a reaction, a methyl group is preferred.

In General Formula (X), $Sp^{21}$ and $Sp^{22}$ each independently represent a single bond, an alkylene group having 1 to 8 carbon atoms, or —Y—$(CH_2)_s$— (where s represents an integer from 2 to 7; Y represents O, OCOO, or COO; and Y is bonded to the aromatic ring of U)). It is preferred that the carbon chain thereof be not so long. $Sp^{21}$ and $Sp^{22}$ are each preferably a single bond or an alkylene group having 1 to 5 carbon atoms, and more preferably a single bond or an alkylene group having 1 to 3 carbon atoms. In the case where $Sp^{21}$ and $Sp^{22}$ each represent —O—$(CH_2)_s$—, s is preferably from 1 to 5, and more preferably from 1 to 3. It is more preferred that at least any one of $Sp^{21}$ and $Sp^{22}$ be a single bond, and it is especially preferred that each of them be a single bond.

In General Formula (X), U represents a linear or branched polyvalent alkylene group having 2 to 20 carbon atoms, a linear or branched polyvalent alkenylene group having 3 to 20 carbon atoms, or a polyvalent cyclic substituent having 5 to 30 carbon atoms; and the alkylene group of the polyvalent alkylene group is optionally substituted with —O—, —CO—, —$CF_2$—, an alkyl group having 5 to 20 carbon atoms (in which the alkylene group is optionally substituted with an oxygen atom provided that oxygen atoms do not adjoin each other), or a cyclic substituent provided that oxygen atoms do not adjoin each other and preferably substituted with two or more cyclic substituents.

In particular, the above-mentioned polymerizable compound is preferably a difunctional monomer represented by General Formula (XX).

[Chem. 76]

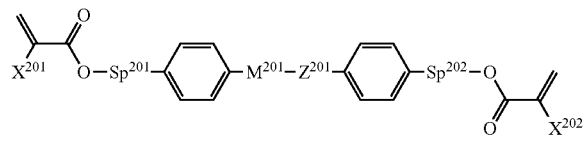

(XX)

(in the formula, $X^{201}$ and $X^{202}$ each independently represent a hydrogen atom or a methyl group;

$Sp^{201}$ and $Sp^{202}$ each independently represent a single bond, an alkylene group having 1 to 8 carbon atoms, or —O—$(CH_2)_s$— (where s represents an integer from 2 to 7, and the oxygen atom is bonded to an aromatic ring);

$Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and $M^{201}$ represents a 1,4-phenylene group, a trans-1,4-cyclohexylene group, or a single bond, and in each 1,4-phenylene group in the formula, any hydrogen atom is optionally substituted with a fluorine atom)

Diacrylate derivatives in which $X^{201}$ and $X^{202}$ each represent a hydrogen atom and dimethacrylate derivatives in which $X^{201}$ and $X^{202}$ are each a methyl group are preferred, and compounds in which one of $X^{201}$ and $X^{202}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^{201}$ and $Sp^{202}$ each independently represent a single bond, an alkylene group having 1 to 8 carbon atoms, or —O—$(CH_2)_s$—; in an application to PSA display devices, at least one of $Sp^{201}$ and $Sp^{202}$ is preferably a single bond, and compounds in which $Sp^{201}$ and $Sp^{202}$ each represent a single bond and compounds in which one of $Sp^{201}$ and $Sp^{202}$ is a single bond and in which the other one thereof represents an alkylene group having 1 to 8 carbon atoms or —O—$(CH_2)_s$— are preferred. In this case, an alkyl group of one to four is preferably employed, and s preferably ranges from 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{201}$ represents a 1,4-phenylene group in which any hydrogen atom is optionally substituted with a fluorine atom, a trans-1,4-cyclohexylene group, or a single bond; and a 1,4-phenylene group and a single bond are preferred. In the case where C does not represent a single bond but represents a ring structure, $Z^{201}$ preferably does not represent a single bond but represents a linking group; in the case where $M^{201}$ represents a single bond, $Z^{201}$ is preferably a single bond.

From these viewpoints, a preferred ring structure between $Sp^{201}$ and $Sp^{202}$ in General Formula (XX) is particularly as follows.

In General Formula (XX), in the case where $M^{201}$ represents a single bond and where the ring structure consists of two rings, the ring structure is preferably represented by any of Formulae (XXa-1) to (XXa-5), more preferably Formulae (XXa-1) to (XXa-3), and especially preferably Formula (XXa-1).

[Chem. 77]

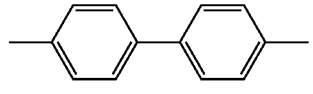

(XXa-1)

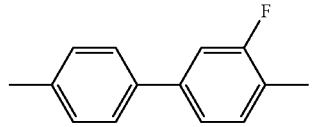

(XXa-2)

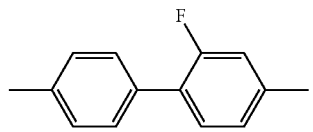

(XXa-3)

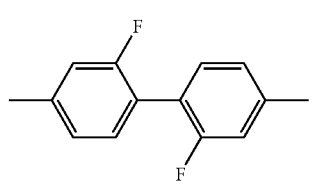

(XXa-4)

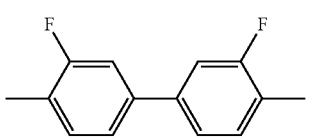

(XXa-5)

(in the formulae, the two ends of each structure are connected to $Sp^{201}$ and $Sp^{202}$, respectively)

Since polymerizable compounds having such skeletons have an optimum alignment regulating force for PSA liquid crystal display devices after being polymerized and thus produce a good alignment state, such polymerizable compounds enable uneven display to be reduced or eliminated.

Accordingly, the polymerizable monomer is especially preferably any of compounds represented by General Formulae (XX-1) to (XX-4), and most preferably the compound represented by General Formula (XX-2).

[Chem.78]

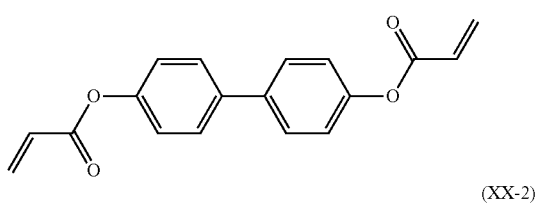

(XX-1)

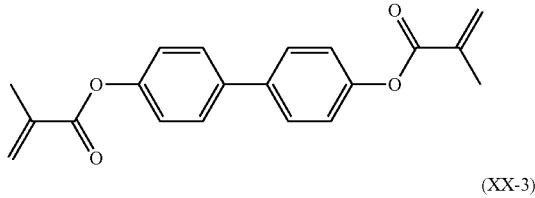

(XX-2)

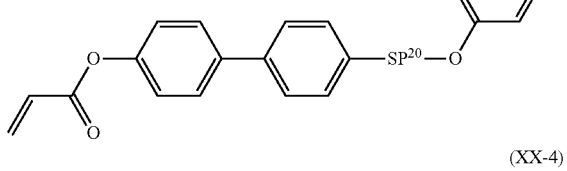

(XX-3)

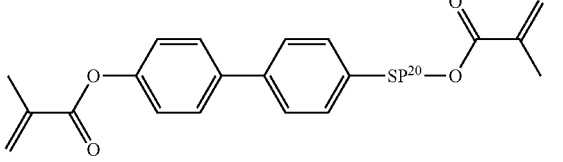

(XX-4)

(in the formulae, $Sp^{20}$ represents an alkylene group having 2 to 5 carbon atoms)

The polymerizable-compound-containing liquid crystal composition in which the polymerizable compound has been added to the liquid crystal composition of the present invention has a low viscosity (η), low rotational viscosity ($\gamma_1$), and a large elastic constant ($K_{33}$); hence, PSA or PSVA liquid crystal display devices using such a composition can satisfy both requirements of reduced uneven display and quick response at the same time.

The amount of the polymerizable compound is preferably in the range of 0.01 mass % to 10 mass %, more preferably 0.01 mass % to 5 mass %, further preferably 0.01 mass % to 2 mass %, and still further preferably 0.1 mass % to 1 mass % relative to the mass of the whole liquid crystal composition.

In the case where the polymerizable compound is added to the composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

The composition of the present invention can further contain any of compounds represented by General Formula (Q).

[Chem. 79]

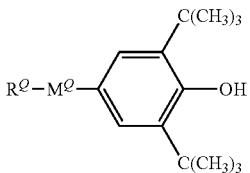

(Q)

(in the formula, $R^Q$ represents a linear or branched alkyl group having 1 to 22 carbon atoms; at least one $CH_2$ group contained in the alkyl group is optionally substituted with —O—, —CH=CH—, —CO—, —OCO—, —COO—, —C≡C—, —CF₂O—, or —OCF₂— such that oxygen atoms do not directly adjoin each other; and $M^Q$ represents a trans-1,4-cyclohexylene group, a 1,4-phenylene group, or a single bond)

$R^Q$ represents a linear or branched alkyl group having 1 to 22 carbon atoms, and at least one $CH_2$ group contained in the alkyl group is optionally substituted with —O—, —CH=CH—, —CO—, —OCO—, —COO—, —C≡C—, —CF₂O—, or —OCF₂— such that oxygen atoms do not directly adjoin each other. $R^Q$ is preferably a linear alkyl group, a linear alkoxy group, a linear alkyl group of which one $CH_2$ group is substituted with —OCO— or —COO—, a branched alkyl group, a branched alkoxy group, or a branched alkyl group of which one $CH_2$ group is substituted with —OCO— or —COO—, each group having 1 to 10 carbon atoms; and more preferably a linear alkyl group, a linear alkyl group of which one $CH_2$ group is substituted with —OCO— or —COO—, a branched alkyl group, a branched alkoxy group, or a branched alkyl group of which one $CH_2$ group is substituted with —OCO— or —COO—, each group having 1 to 20 carbon atoms. $M^Q$ represents a trans-1,4-cyclohexylene group, a 1,4-phenylene group, or a single bond and is preferably a trans-1,4-cyclohexylene group or a 1,4-phenylene group.

More specifically, the compound represented by General Formula (Q) is preferably any of compounds represented by General Formulae (Q-a) to (Q-d).

[Chem. 80]

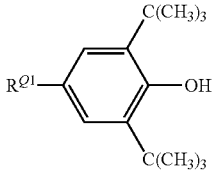

(Q-a)

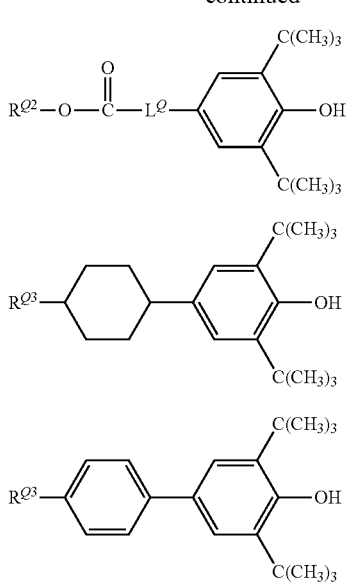

In the formulae, $R^{Q1}$ is preferably a linear or branched alkyl group having 1 to 10 carbon atoms, $R^{Q2}$ is preferably a linear or branched alkyl group having 1 to 20 carbon atoms, $R^{Q3}$ is preferably a linear or branched alkyl or alkoxy group having 1 to 8 carbon atoms, and $L^Q$ is preferably a linear or branched alkylene group having 1 to 8 carbon atoms. Among the compounds represented by General Formulae (Q-a) to (Q-d), the compounds represented by General Formulae (Q-c) and (Q-d) are preferred.

The composition of the present invention preferably contains one or two compounds represented by General Formula (Q), and more preferably one to five; the amount thereof is preferably in the range of 0.001 mass % to 1 mass %, more preferably 0.001 mass % to 0.1 mass %, and especially preferably 0.001 mass % to 0.05 mass % relative to the mass of the whole liquid crystal composition.

The composition of the present invention, to which a polymerizable compound has been added, is used in liquid crystal display devices in which the polymerizable compound is polymerized by being irradiated with ultraviolet for alignment of liquid crystal molecules and in which the birefringence of the composition is utilized to control the amount of light that is to be transmitted. Such a liquid crystal composition is useful for liquid crystal display devices, such as an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate. A color filter can be produced by, for instance, a pigment dispersion technique, a printing technique, an electrodeposition technique, or a staining technique. In production of the color filter by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filter. Active elements such as a TFT, a thin-film diode, a metal insulator, and a metal specific resistance element may be provided on the resulting substrate to form pixel electrodes.

The substrates are arranged so as to face each other with the transparent electrode layer being interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 µm, and more preferably 1.5 to 10 µm. In the case where a polarizing plate is used, the product of the refractive index anisotropy Δn of liquid crystal and a cell thickness d is preferably adjusted for maximization of contrast. In the case where two polarizing plates are used, the polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing composition can be put into the space between the two substrates by, for example, a vacuum injection technique or ODF technique which is generally employed. A vacuum injection technique, however, has a problem in which traces of the injection remain while droplet stains are not generated. The present invention can be more suitably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the composition is dropped onto part of the substrate surrounded by the applied sealing material in a degassed atmosphere, and then the frontplane and the backplane are bonded to each other, thereby being able to manufacture a liquid crystal display device. The composition of the present invention can be stably dropped in an ODF process and can be therefore desirably used.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjustment of conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjustment of voltage that is to be applied. In MVA-mode liquid crystal display devices which involve use of a horizontal electric field, a pretilt angle is preferably controlled to be from 80 degrees to 89.9 degrees in view of alignment stability and contrast.

The temperature in the irradiation procedure is preferably within a temperature range in which the liquid crystal state of the composition of the present invention can be maintained. Polymerization is preferably carried out at a temperature close to room temperature, i.e., typically from 15 to 35° C. Examples of a lamp that is usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the composition; it is preferred that an ultraviolet ray in a particular wavelength range be cut off as needed. The intensity of an ultraviolet ray to be emitted is preferably from 0.1 mW/cm$^2$ to 100 W/cm$^2$, and more preferably 2 mW/cm$^2$ to 50 W/cm$^2$. The energy of an ultraviolet ray to be emitted can be appropriately adjusted: preferably from 10 mJ/cm$^2$ to 500 J/cm$^2$, and more preferably 100 mJ/cm$^2$ to 200 J/cm$^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the composition of the present invention are practical because they quickly respond and are less likely to suffer from defective display at the same time; in particular, the composition is useful to active-matrix liquid crystal display devices and can be applied to liquid crystal display devices of a VA mode, PSVA mode, PSA mode, IPS mode, and ECB mode.

EXAMPLES

Although the present invention will now be described further in detail with reference to Examples, the present invention is not limited thereto. In compositions which will be described in Examples and Comparative Examples, the term "%" refers to "mass %".

In Examples, compounds are abbreviated as follows. n represents a natural number.
(Side Chains)
 -n —$C_nH_{2n+1}$ linear alkyl group having n carbon atoms
 n- $C_nH_{2n+1}$— linear alkyl group having n carbon atoms
 —On —$OC_nH_{2n+1}$ linear alkoxyl group having n carbon atoms
 nO— $C_nH_{2n+1}O$— linear alkoxyl group having n carbon atoms
 —V —CH=CH$_2$
 V— CH$_2$=CH—
 —V1 —CH=CH—CH$_3$
 1V— CH$_3$—CH=CH—
 -2V —CH$_2$—CH$_2$—CH=CH$_3$
 V2- CH$_3$=CH—CH$_2$—CH$_2$—
 -2V1 —CH$_2$—CH$_2$—CH=CH—CH$_3$
 1V2- CH$_3$—CH=CH—CH$_2$—CH$_2$
(Linking Groups)
 -n- —$C_nH_{2n}$—
 -nO— —$C_nH_{2n}$—O—
 —On- —O—$C_nH_{2n}$—
 —COO— —C(=O)—O—
 —OCO— —O—C(=O)—
 —CF2O— —CF$_2$—O—
 —OCF2- —O—CF$_2$—
(Ring Structures)

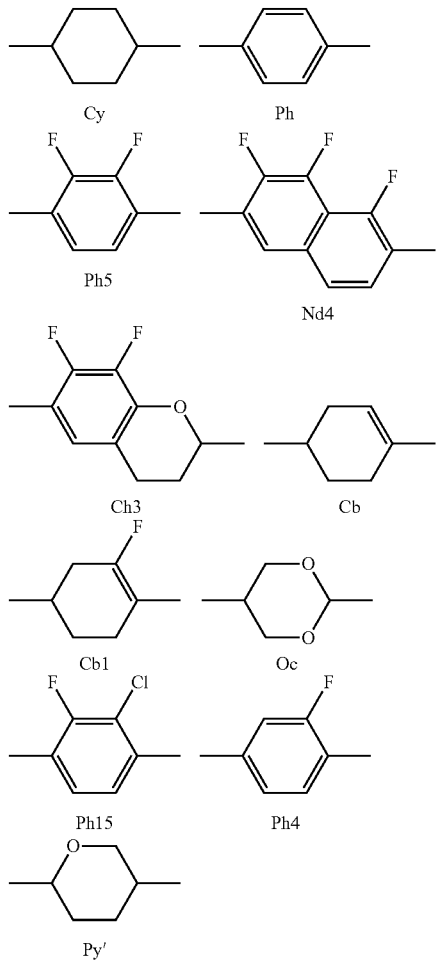

In Examples, the following properties were measured.
 $T_{ni}$: Nematic phase-isotropic liquid phase transition temperature (° C.)
 Δn: Refractive index anisotropy at 20° C.
 Δε: Dielectric anisotropy at 20° C.
 η: Viscosity at 20° C. (mPa·s)
 $γ_1$: Rotational viscosity at 20° C. (mPa·s)
 $K_{11}$: Elastic constant $K_{11}$ at 20° C. (pN)
 $K_{33}$: Elastic constant $K_{33}$ at 20° C. (pN)

Initial VHR: initial voltage holding ratio (%) measured with VHR-1 (manufactured by TOYO Corporation) at a frequency of 60 Hz, an applied voltage of 1 V, and a temperature of 60° C.

VHR at 150° C. after one hour: voltage holding ratio (%) measured with VHR-1 (manufactured by TOYO Corporation) at a frequency of 60 Hz, an applied voltage of 1 V, and a temperature of 60° C. after heating at 150° C. for an hour In measurement of the response speed of a sample, the measurement was carried out at Vsel of 8 V, Vnsel of 1 V, and a measurement temperature of 20° C. with DMS301 manufactured by AUTRONIC-MELCHERS GmbH.

In evaluation of image-sticking in a liquid crystal display device, a certain fixed pattern was displayed in a display area for 24 hours, and then a halftone image was shown evenly on the whole of the screen. Then, the degree of an afterimage of the fixed pattern was visually observed, and result of the observation was evaluated on the basis of the following four criteria.

Excellent: No afterimage observed
Good: Slight afterimage observed, but acceptable
Bad: Afterimage observed, unacceptable
Poor: Afterimage observed, quite inadequate In evaluation of light transmittance, the visual light transmittance of a liquid crystal display device was measured with an LCD evaluation system LCD-5200 (manufactured by Otsuka Electronics Co., Ltd.).

In comparison of light transmittance between Example and Comparative Example appended by the same reference number, the light transmittance was evaluated on the basis of the following criteria with reference to Example (light transmittance in Example serves as a comparison reference and is therefore given the symbol "–").

Excellent: High light transmittance
Good: Equivalent light transmittance
Poor: Low light transmittance In order to evaluate solubility at low temperature, a liquid crystal composition was prepared and then weighted to 1 g in a 2-mL sample bottle, and the sample bottle was subjected to a continuous temperature change in a temperature controlled chamber in a cycle of the following operation: −25° C. (retained for an hour)→heating (0.1° C./min)→0° C. (retained for an hour)→heating (0.1° C./min)→20° C. (retained for an hour)→cooling (−0.1° C./min)→0° C. (retained for an hour)→cooling (−0.1° C./min)→−25° C. Then, precipitate generated in the liquid crystal composition was visually observed and evaluated on the basis of the following four criteria.

Excellent: No precipitation observed for 500 hours or longer
Good: No precipitation observed for 250 hours or longer
Bad: Precipitation observed within 125 hours
Poor: Precipitation observed within 72 hours In order to measure or evaluate response speed, image-sticking of a liquid crystal display device, and light transmittance, a liquid crystal display device of an FFS mode with a cell thickness of 3.0 μm was produced in Examples 1 to 8 and Comparative Examples 1 to 8, and a vertical-alignment liquid crystal display device (liquid crystal display device of VA mode) generally used in TV sets and having a cell thickness of 3.5 μm was produced in Examples 9 to 16 and Comparative Examples 9 to 16.

In Examples 9 and 10 and Comparative Examples 9 and 10, a pretilt angle was generated through a general rubbing process.

In Examples 11 to 16 and Comparative Examples 11 to 16, a pretilt angle was generated through radiation of 60 J (365 nm) of UV under application of a square wave voltage of 10 V at a frequency of 100 kHz. The UV light source was a multilight manufactured by USHIO INC.

The following compounds (P-b-1), (P-b-3), (P-a-31), (P-d-29), and (P-d-37) were used as representative examples of a polymerizable compound, but the present invention is not limited thereby.

[Chem. 82]

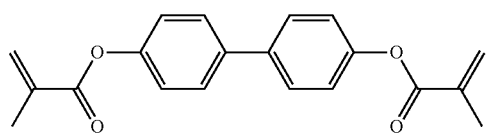

(P-b-1)

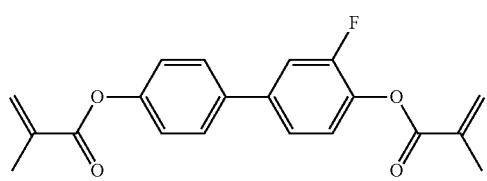

(P-b-3)

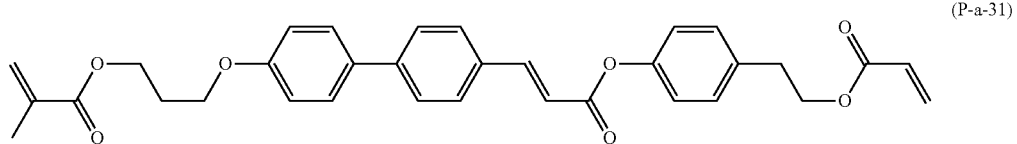

(P-a-31)

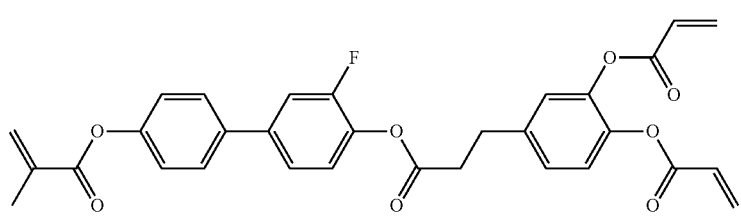

(P-d-29)

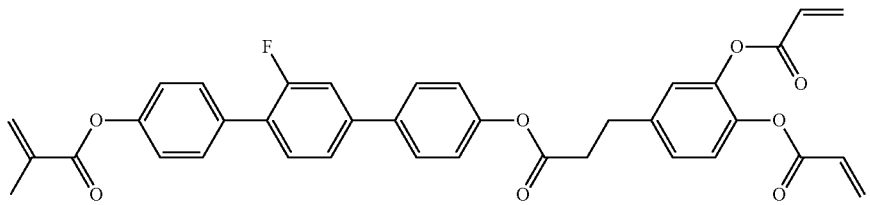
(P-d-37)

Examples 1 to 5 and Comparative Examples 1 to 5-2

LC-1 to LC-5 (Examples 1 to 5) and LC-1' to LC-5" (Comparative Examples 1 to 5-2) were prepared. Table 1 shows the constitution and properties of the liquid crystal compositions. The symbols that are on the left side of amounts are the above-mentioned abbreviations of the compounds.

TABLE 1

|  | Example 1 LC-1 | Comparative Example 1 LC-1' | Example 2 LC-2 | Comparative Example 2 LC-2' | Example 3 LC-3 | Comparative Example 3 LC-3' | Example 4 LC4 | Comparative Example 4 LC4' | Example 5 LC-5 | Comparative Example 5-1 LC-5' | Comparative Example 5-2 LC-5" |
|---|---|---|---|---|---|---|---|---|---|---|---|
| 3-Cy-Cy-V | 20 | 20 | 23 | 23 | 23 | 23 | 20 | 20 | 33 | 33 | 33 |
| 3-Cy-Cy-V1 | 10 | 10 | 10 | 10 | 8 | 8 | 3 | 5 |  |  |  |
| 2-Cy-Cy-V1 | 12 | 10 | 2 |  | 4 | 2 | 10 | 5.5 |  |  |  |
| 3-Cy-Cy-Ph-1 |  |  |  |  | 2 | 5 |  |  |  |  |  |
| 3-Cy-Ph—Ph-2 |  |  |  | 5 | 2 |  | 5 | 5 | 3 | 3 | 3 |
| 5-Cy-Ph—Ph-2 |  |  | 2 | 5 |  |  | 2 | 1 | 3 | 3 | 3 |
| V-Cy-Ph—Ph-3 | 3 | 10 | 4 | 2.5 | 2 | 7 |  | 11 |  |  |  |
| 1V-Cy-Ph—Ph-3 | 6 |  | 5 |  | 6 |  | 4 |  |  |  |  |
| 2V-Cy-Ph—Ph-3 |  |  |  |  |  |  | 4 |  |  | 8 |  |
| 1V-Cy-Ph—Ph-1 |  |  |  |  |  |  |  |  | 8 |  |  |
| 1V2-Cy-Ph—Ph-3 |  |  |  |  |  |  |  |  |  |  | 8 |
| 3-Cy-1O—Ph5—O1 | 3 | 3 | 3.5 | 3.5 | 3.5 | 3.5 | 2 | 2 | 2 | 2 | 2 |
| 3-Cy-1O—Ph5—O2 | 7 | 7 | 11 | 11 | 11 | 11 | 10 | 10 | 10 | 10 | 10 |
| 1V-Cy-1O—Ph5—O1 |  |  |  |  |  |  | 4 | 5 | 4 | 4 | 4 |
| 1V-Cy-1O—Ph5—O2 | 6 | 6 | 4 | 4 | 4 | 4 | 4 | 3 | 4 | 4 | 4 |
| 2-Cy-Cy-1O—Ph5—O2 | 9 | 10 | 11 | 11 | 10.5 | 10.5 | 2 | 3 | 3 | 3 | 3 |
| 3-Cy-Cy-1O—Ph5—O2 | 12 | 12 | 11 | 11 | 10.5 | 10.5 | 8 | 9.5 | 10 | 10 | 10 |
| V-Cy-Cy-1O—Ph5—O2 | 2 | 2 | 2 | 2 | 2 | 2 | 4 | 4 | 4 | 4 | 4 |
| V-Cy-Cy-1O—Ph5—O3 |  |  |  | 3 |  |  | 4 | 4 | 4 | 4 | 4 |
| 1V-Cy-Cy-1O—Ph5—O1 | 5 | 5 |  |  |  |  | 5 | 4 | 3 | 3 | 3 |
| 1V-Cy-Cy-1O—Ph5—O2 | 5 | 5 | 5.5 | 3 | 5.5 | 5.5 | 5 | 4 | 5 | 5 | 5 |
| 3-Ph—Ph5—Ph-1 |  |  | 3 | 3 | 3 | 4 | 2 | 2 | 4 | 2 | 2 |
| 3-Ph—Ph5—Ph-2 |  |  | 3 | 3 | 3 | 4 | 2 | 2 |  | 2 | 2 |
| Tni/° C. | 84.7 | 84.6 | 84.6 | 85.4 | 84.5 | 84.2 | 85.0 | 85.0 | 83.8 | 83.8 | 84.2 |
| $\Delta n$ | 0.089 | 0.089 | 0.100 | 0.100 | 0.099 | 0.099 | 0.100 | 0.102 | 0.098 | 0.098 | 0.093 |
| $\Delta\varepsilon$ | −4.0 | −4.0 | −4.0 | −4.0 | −4.0 | −4.0 | −4.0 | −4.0 | −4.0 | −4.0 | −4.0 |
| $\gamma_1$/mPa · s 20° C. | 131 | 131 | 130 | 131 | 130 | 130 | 123 | 122 | 117 | 117 | 121 |
| K11[pN] | 17.1 | 16.4 | 16.7 | 16.4 | 16.5 | 16.2 | 16.8 | 15.8 | 15.5 | 15.5 | 15.6 |
| K33[pN] | 18.7 | 17.2 | 18.3 | 16.2 | 18.4 | 16.3 | 18.9 | 16.8 | 17.6 | 17.4 | 17.8 |
| $\gamma_1$/K33 | 7.0 | 7.6 | 7.1 | 8.1 | 7.1 | 8.0 | 6.5 | 7.3 | 6.6 | 6.7 | 6.8 |
| Initial VHR | 99.5 | 99.4 | 99.5 | 99.4 | 99.4 | 99.4 | 99.5 | 99.5 | 99.2 | 99.3 | 99.3 |
| VHR at 150° C. after one hour | 99.1 | 99.0 | 99.1 | 98.9 | 98.9 | 98.7 | 99.1 | 99.1 | 98.6 | 98.7 | 98.7 |
| Response speed (ms) | 34.4 | 36.9 | 34.7 | 37.5 | 34.2 | 37.8 | 33.1 | 34.7 | 33.1 | 33.4 | 33.8 |
| Evaluation of image-sticking | Good | Good | Good | Good | Good | Good | Good | Good | Good | Good | Good |
| Light transmittance | — | Poor | — | Poor | — | Poor | — | Poor | — | Poor | Good |
| Solubility at low temperature | Excellent | Good | Excellent | Excellent | Excellent | Excellent | Excellent | Good | Excellent | Poor | Excellent |

Each of the LC-1, LC-2, LC-3, LC-4, and LC-5 as the liquid crystal composition of the present invention contained the compound represented by General Formula (i) and therefore had sufficiently smaller $\gamma_1$ and larger $K_{33}$ than the LC-1' to LC-5" (Comparative Examples) as liquid crystal compositions that were free from the compound represented by General Formula (i). Thus, in the LC-1 to LC-5, $\gamma_1/K_{33}$ that is the indicator of response speed was small; furthermore, the response speed thereof was measured, and the result of the measurement showed an improvement in the response speed in a similar degree. The liquid crystal compositions LC-1 to LC-5 were used to produce liquid crystal display devices of an FFS mode, and the devices were subjected to the evaluation of a voltage holding ratio, image-sticking, light transmittance, and dissolution at low temperature in the above-mentioned manners. The results of the evaluations were remarkably good.

Accordingly, the liquid crystal composition of the present invention had a sufficiently good nematic phase-isotropic liquid phase transition temperature ($T_{ni}$), refractive index anisotropy ($\Delta n$), dielectric anisotropy ($\Delta \varepsilon$), rotational viscosity ($\gamma_1$), elastic constant ($K_{33}$), and heat resistance; and the liquid crystal display device of an FFS mode produced by using such a liquid crystal composition had an excellent display quality.

Example 6 and Comparative Example 6

LC-6 (Example 6) and LC-6' (Comparative Example 6) were prepared. Table 2 shows the constitution and properties of the liquid crystal compositions.

TABLE 2

|  | Example 6 LC-6 | Comparative Example 6 LC-6' |
|---|---|---|
| 3-Cy-Cy-V | 36 | 35 |
| 3-Cy-Cy-Ph-1 |  | 2 |
| V-Cy-Ph—Ph-3 |  | 3 |
| 1V-Cy-Ph—Ph-3 | 4 |  |
| 2-Cy-Cy-Ph5—O1 | 7 | 7 |
| 2-Cy-Cy-Ph5—O2 | 6 | 6 |
| 2-Cy-Cy-Ph5—O3 | 6 | 6 |
| 3-Cy-Cy-Ph5—O4 | 7 | 7 |
| 2-Cy-Ph—Ph5—O2 | 7 | 7 |
| 3-Cy-Ph—Ph5—O2 | 7 | 7 |
| 3-Cy-Ph5—O4 | 10 | 10 |
| 5-Cy-Ph5—O2 | 10 | 10 |
| Tni/° C. | 85.3 | 85.4 |
| $\Delta n$ | 0.099 | 0.098 |
| $\Delta \varepsilon$ | −3.4 | −3.4 |
| $\gamma_1$/mPa · s20° C. | 134 | 133 |
| K11[pN] | 15.6 | 15.3 |
| K33[pN] | 16.3 | 15.4 |

TABLE 2-continued

|  | Example 6 LC-6 | Comparative Example 6 LC-6' |
|---|---|---|
| $\gamma_1$/K33 | 8.2 | 8.6 |
| Initial VHR | 99.5 | 99.4 |
| VHR at 150° C. after one hour | 99.1 | 99.0 |
| Response speed (ms) | 38.2 | 41.1 |
| Evaluation of image-sticking | Good | Good |
| Light transmittance | — | Poor |
| Solubility at low temperature | Excellent | Excellent |

The LC-6 as the liquid crystal composition of the present invention contained the compound represented by General Formula (i) and therefore had a larger $K_{33}$ than the LC-6' (Comparative Example) as a liquid crystal composition that was free from the compound represented by General Formula (i). Thus, in the LC-6, $\gamma_1/K_{33}$ that is the indicator of response speed was small; furthermore, the response speed thereof was measured, and the result of the measurement showed an improvement in the response speed in a similar degree. The liquid crystal composition LC-6 was used to produce a liquid crystal display device of an FFS mode, and the device was subjected to the evaluation of a voltage holding ratio, image-sticking, light transmittance, and dissolution at low temperature in the above-mentioned manner. The results of the evaluations were remarkably good.

Accordingly, the liquid crystal composition of the present invention had a sufficiently good nematic phase-isotropic liquid phase transition temperature ($T_{ni}$), refractive index anisotropy ($\Delta n$), dielectric anisotropy ($\Delta \varepsilon$), rotational viscosity ($\gamma_1$), elastic constant ($K_{33}$), and heat resistance; and the liquid crystal display device of an FFS mode produced by using such a liquid crystal composition had an excellent display quality.

Examples 7 to 9 and Comparative Examples 7 to 9

LC-7 to 9 (Examples 7 to 9) and LC-7' to LC-9' (Comparative Examples 7 to 9) were prepared. Table 3 shows the constitution and properties of the liquid crystal compositions.

TABLE 3

|  | Example 7 LC-7 | Comparative Example 7 LC-7' | Example 8 LC-8 | Comparative Example 8 LC-8' | Example 9 LC-9 | Comparative Example 9 LC-9' |
|---|---|---|---|---|---|---|
| 3-Cy-Cy-V | 20 | 20 | 33.5 | 28.5 | 24.5 | 24.5 |
| 3-Cy-Cy-V1 | 4 | 5 |  | 5 | 10 | 9 |
| 2-Cy-Cy-V1 | 10 | 8 |  |  |  |  |
| 3-Ph—Ph-1 |  |  |  |  | 7.5 | 7.5 |
| 3-Cy-Ph—Ph-2 |  | 6 |  | 4.5 |  | 5 |
| V-Cy-Ph—Ph-3 | 6 | 6 | 4.5 | 3 |  |  |
| 1V-Cy-Ph—Ph-3 | 5 |  | 5 |  | 4 |  |
| 3-Cy-1O—Ph5—O1 |  |  | 3 | 3 |  |  |
| 3-Cy-1O—Ph5—O2 | 3 | 3 | 5 | 5 | 11 | 11 |
| 1V-Cy-1O—Ph5—O2 |  |  |  |  | 5 | 5 |
| 2-Cy-Cy-1O—Ph5—O2 |  |  |  |  | 6 | 6 |
| 3-Cy-Cy-1O—Ph5—O2 | 5 | 5 | 4 | 4 | 13 | 13 |
| V-Cy-Cy-1O—Ph5—O2 | 3 | 3 | 4 | 4 |  |  |
| V-Cy-Cy-1O—Ph5—O3 |  |  | 2 | 2 |  |  |
| 1V-Cy-Cy-1O—Ph5—O1 | 3 | 3 | 5 | 5 |  |  |
| 1V-Cy-Cy-1O—Ph5—O2 | 5 | 5 | 5 | 5 | 9 | 9 |
| 3-Ph—Ph5—Ph-1 |  |  | 3 | 4 | 5 | 5 |
| 3-Ph—Ph5—Ph-2 | 3 | 3 | 8 | 9 | 5 | 5 |
| 3-Ph—Ph5—O2 | 5 | 5 |  |  |  |  |
| 5-Ph—Ph5—O2 | 3 | 3 |  |  |  |  |
| 3-Cy-Py'—Ph5—O2 | 3 | 3 |  |  |  |  |
| 3-Cy-2-Ph5—O3 | 5 | 5 | 4 | 4 |  |  |
| 3-Cy-2-Ph5—O4 | 5 | 5 | 4 | 4 |  |  |
| 3-Cy-Cy-2-Ph5—O3 | 6 | 6 | 5 | 5 |  |  |

TABLE 3-continued

|  | Example 7 LC-7 | Comparative Example 7 LC-7' | Example 8 LC-8 | Comparative Example 8 LC-8' | Example 9 LC-9 | Comparative Example 9 LC-9' |
|---|---|---|---|---|---|---|
| 3-Cy-Cy-2-Ph5—O4 | 6 | 6 | 5 | 5 |  |  |
| Tni/° C. | 82.2 | 82.7 | 85.4 | 85.3 | 75.9 | 75.9 |
| Δn | 0.096 | 0.096 | 0.100 | 0.101 | 0.109 | 0.109 |
| Δε | −4.0 | −4.0 | −3.9 | −4.0 | −3.7 | −3.7 |
| γ1/mPa · s 20° C. | 137 | 137 | 139 | 143 | 114 | 114 |
| K11[pN] | 15.4 | 15.5 | 16.2 | 16.2 | 15.9 | 15.4 |
| K33[pN] | 17.1 | 16.0 | 17.4 | 16.6 | 17.0 | 16.1 |
| γ1/K33 | 8.0 | 8.6 | 8.0 | 8.6 | 6.7 | 7.1 |
| Initial VHR | 99.3 | 99.3 | 99.5 | 99.5 | 99.5 | 99.5 |
| VHR at 150° C. after one hour | 98.2 | 98.3 | 99.1 | 99.2 | 99.1 | 99.0 |
| Response speed (ms) | 37.7 | 40.1 | 37.8 | 40.3 | 15.3 | 16.9 |
| Evaluation of image-sticking | Good | Good | Good | Good | Good | Good |
| Light transmittance | — | Poor | — | Poor | — | Good |
| Solubility at low temperature | Excellent | Excellent | Excellent | Excellent | Excellent | Excellent |

Each of the LC-7 to LC-9 as the liquid crystal composition of the present invention contained the compound represented by General Formula (i) and therefore had a larger $K_{33}$ than the LC-7' to LC-9' (Comparative Examples) as liquid crystal compositions that were free from the compound represented by General Formula (i). Thus, in the LC-7 to LC-9, $\gamma_1/K_{33}$ that is the indicator of response speed was small; furthermore, the response speed thereof was measured, and the result of the measurement showed an improvement in the response speed in a similar degree. The liquid crystal compositions LC-7 and LC-8 were used to produce liquid crystal display devices of an FFS mode; the liquid crystal composition LC-9 was used to produce a liquid crystal display device of a VA mode; and the devices were subjected to the evaluation of a voltage holding ratio, image-sticking, light transmittance, and dissolution at low temperature in the above-mentioned manner. The results of the evaluations were remarkably good.

Accordingly, the liquid crystal composition of the present invention had a sufficiently good nematic phase-isotropic liquid phase transition temperature ($T_{ni}$), refractive index anisotropy (Δn), dielectric anisotropy (Δε), rotational viscosity ($\gamma_1$), elastic constant ($K_{33}$), and heat resistance; and the liquid crystal display device of an FFS mode or VA mode produced by using such a liquid crystal composition had an excellent display quality.

Example 10 and Comparative Example 10

LC-10 (Example 10) and LC-10' (Comparative Example 10) were prepared. Table 4 shows the constitution and properties of the liquid crystal compositions.

TABLE 4

|  | Example 10 LC-10 | Comparative Example 10 LC-10' |
|---|---|---|
| 3-Cy-Cy-2 | 20 | 19 |
| 3-Cy-Cy-4 | 8 | 7 |
| 3-Cy-Cy-5 | 5 | 7 |
| 3-Ph—Ph-1 | 9 | 9 |
| 3-Cy-Ph—O1 | 4 | 2.5 |
| V-Cy-Ph—Ph-3 |  | 5.5 |
| 1V-Cy-Ph—Ph-3 | 5 |  |
| 3-Cy-1O—Ph5—O2 | 4 | 4.5 |
| 1V-Cy-1O—Ph5—O1 | 5 | 5 |
| 1V-Cy-1O—Ph5—O2 | 5 | 5 |
| 2-Cy-Ph—Ph5—O2 | 7 | 7 |
| 3-Cy-Ph—Ph5—O2 | 8 | 8 |
| 1V-Cy-Cy-1O—Ph5—O2 | 9 | 9 |
| 1V-Cy-Cy-1O—Ph5—O3 | 8 | 8 |
| 3-Ph—Ph5—Ph-2 | 3 | 3.5 |
| Tni/° C. | 76.0 | 76.3 |
| Δn | 0.109 | 0.110 |
| Δε | −3.0 | −3.1 |
| ε⊥ | 6.4 | 6.48 |
| γ1/mPa · s20° C. | 119 | 120 |
| K11[pN] | 15.5 | 15.3 |
| K33[pN] | 15.7 | 15.0 |
| γ1/K33 | 7.6 | 8.0 |
| Initial VHR | 99.5 | 99.6 |
| VHR at 150° C. after one hour | 99.2 | 99.1 |
| Response speed (ms) | 18.1 | 19.0 |
| Evaluation of image-sticking | Good | Good |
| Light transmittance | — | Good |
| Solubility at low temperature | Excellent | Excellent |

The LC-10 as the liquid crystal composition of the present invention contained the compound represented by General Formula (i) and therefore had a smaller $\gamma_1$ and larger $K_{33}$ than the LC-10' (Comparative Example) as a liquid crystal composition that was free from the compound represented by General Formula (i). Thus, in the LC-10, $\gamma_1/K_{33}$ that is the indicator of response speed was small; furthermore, the response speed thereof was measured, and the result of the measurement showed an improvement in the response speed in a similar degree. The liquid crystal composition LC-10 was used to produce a liquid crystal display device of a VA mode, and the device was subjected to the evaluation of a voltage holding ratio, image-sticking, light transmittance, and dissolution at low temperature in the above-mentioned manner. The results of the evaluations were remarkably good.

Accordingly, the liquid crystal composition of the present invention had a sufficiently good nematic phase-isotropic liquid phase transition temperature ($T_{ni}$), refractive index anisotropy ($\Delta n$), dielectric anisotropy ($\Delta \varepsilon$), rotational viscosity ($\gamma_1$), elastic constant ($K_{33}$), and heat resistance; and the liquid crystal display device of a VA mode produced by using such a liquid crystal composition had an excellent display quality.

Examples 11 to 16 and Comparative Examples 11 to 16

MLC-1 (Example 11), MLC-2 (Example 12), MLC-3 (Example 13), MLC-4 (Example 14), MLC-5 (Example 15), and MLC-6 (Example 16) were prepared. MLC-1' (Comparative Example 11), MLC-2' (Comparative Example 12), MLC-3' (Comparative Example 13), MLC-4' (Comparative Example 14), MLC-5' (Comparative Example 15), and MLC-6' (Comparative Example 16) were prepared. Tables 5 and 6 show the constitution of the liquid crystal compositions and results of the evaluations of the properties thereof.

TABLE 5

|  |  | Example 11 MLC-1 | Comparative Example 11 MLC-1' | Example 12 MLC-2 | Comparative Example 12 MLC-2' | Example 13 MLC-3 | Comparative Example 13 MLC-3' |
|---|---|---|---|---|---|---|---|
| LC-9 |  | 99.7 |  |  |  | 99.6 |  |
| LC-9' |  |  | 99.7 |  |  |  | 99.6 |
| LC-10 |  |  |  | 99.7 |  |  |  |
| LC-10' |  |  |  |  | 99.7 |  |  |
| Polymerizable compound | Formula (P-b-1) | 0.3 | 0.3 |  |  |  |  |
| Polymerizable compound | Formula (P-b-3) |  |  | 0.3 | 0.3 |  |  |
| Polymerizable compound | Formula (P-a-31) |  |  |  |  | 0.4 | 0.4 |
| Polymerizable compound | Formula (P-d-29) |  |  |  |  |  |  |
| Polymerizable compound | Formula (P-d-37) |  |  |  |  |  |  |
| Initial VHR |  | 99.5 | 99.5 | 99.5 | 99.5 | 99.5 | 99.5 |
| VHR at 150° C. after one hour |  | 99.0 | 98.8 | 99.1 | 99.0 | 98.5 | 98.2 |
| Response speed (ms) |  | 14.9 | 16.4 | 17.5 | 18.6 | 15.1 | 16.7 |
| Evaluation of image-sticking |  | Good | Good | Good | Good | Good | Good |
| Light transmittance |  | — | Good | — | Good | — | Good |
| Solubility at low temperature |  | Excellent | Excellent | Excellent | Excellent | Excellent | Excellent |

TABLE 6

|  |  | Example 14 MLC-4 | Comparative Example 14 MLC-4' | Example 15 MLC-5 | Comparative Example 15 MLC-5' | Example 16 MLC-6 | Comparative Example 16 MLC-6' |
|---|---|---|---|---|---|---|---|
| LC-9 |  |  |  | 99.8 |  | 99.6 |  |
| LC-9' |  |  |  |  | 99.8 |  | 99.6 |
| LC-10 |  | 99.6 |  |  |  |  |  |
| LC-10' |  |  | 99.6 |  |  |  |  |
| Polymerizable compound | Formula (P-b-1) |  |  |  |  |  |  |
| Polymerizable compound | Formula (P-b-3) |  |  |  |  |  |  |
| Polymerizable compound | Formula (P-a-31) |  |  |  |  |  |  |
| Polymerizable compound | Formula (P-d-29) | 0.4 | 0.4 |  |  | 0.35 | 0.35 |
| Polymerizable compound | Formula (P-d-37) |  |  | 0.2 | 0.2 | 0.05 | 0.05 |
| Initial VHR |  | 99.5 | 99.5 | 99.5 | 99.5 | 99.5 | 99.5 |
| VHR at 150° C. after one hour |  | 99.0 | 99.0 | 99.1 | 99.0 | 99.0 | 99.1 |
| Response speed (ms) |  | 17.4 | 18.4 | 15.0 | 16.8 | 14.8 | 16.6 |
| Evaluation of image-sticking |  | Good | Good | Good | Good | Good | Good |
| Light transmittance |  | — | Good | — | Good | — | Good |
| Solubility at low temperature |  | Excellent | Excellent | Excellent | Excellent | Excellent | Excellent |

In each of the MLC-1 to MLC-6 as the liquid crystal composition of the present invention, a proper pretilt angle ranging from 85 to 88° was generated, and a response speed was improved. Liquid crystal display devices of a PSVA or PSA mode produced by using such liquid crystal compositions had an excellent display quality.

The invention claimed is:

1. A liquid crystal composition having a negative dielectric anisotropy, the composition comprising a first component that is at least one compound represented by General Formula (i)

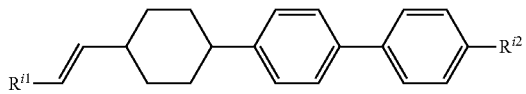
(i)

(where $R^{i1}$ represents an alkyl group having 1 to 8 carbon atoms, and $R^{i2}$ represents an alkyl group having 3 to 8 carbon atoms) and
a second component that is at least e compound selected from compounds represented by General Formula (L)

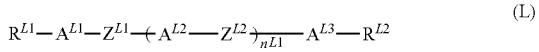
(L)

(where $R^{L1}$ and $R^{L2}$ each independently represent an alkyl group having 1 to 8 carbon atoms; in the alkyl group, one —CH$_2$— or at least two —CH$_2$-'s not adjoining each other are each independently optionally substituted with —CH═CH—, —C≡C—, —O—, —CO—, —COO—, or —OCO—;
$n^{L1}$ represents 0, 1, 2, or 3;
$A^{L1}$, $A^{L2}$, and $A^{L3}$ each independently represent a group selected from the group consisting of
(a) a 1,4-cyclohexylene group (in which one —CH$_2$— or at least two —CH$_2$—'s not adjoining each other are each optionally substituted with —O—),
(b) a 1,4-phenylene group (in which one —CH═ or at least two —CH═'s not adjoining each other are each optionally substituted with —N═), and
(c) a naphthalene-2,6-diyl group, a 1,2,3,4-tetrahydronaphthalene-2,6-diyl group, or a decahydronaphthalene-2,6-diyl group (in the naphthalene-2,6-diyl group or the 1,2,3,4-tetrahydronaphthalene-2,6-diyl group, one —CH═ or at least two —CH═'s not adjoining each other are each optionally substituted with —N═);
the groups (a) to (c) are each independently optionally substituted with a cyano group, a fluorine atom, or a chlorine atom;
$Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH═N—N═CH—, —CH═CH—, —CF═CF—, or —C≡C—;
in the case where $n^{L1}$ is 2 or 3 and where $A^{L2}$ is multiple, the multiple $A^{L2}$'s may be the same as or different from each other; in the case where $n^{L1}$ is 2 or 3 and where $Z^{L3}$ is multiple, the multiple $Z^{L3}$'s may be the same as or different from each other; and the compound represented by General Formula (L) excludes the compound represented by General Formula (i)).

2. The liquid crystal composition according to claim 1, wherein at least one compound selected from compounds represented by General Formula (L-1) is used as the second component

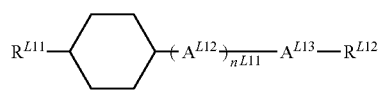
(L-1)

(where $R^{L11}$, $R^{L12}$, $A^{L12}$, and $A^{L13}$ independently have the same meanings as $R^{L1}$, $R^{L2}$, $A^{L2}$, and $A^{L3}$ in General Formula (L), respectively; and $n^{L11}$ represents 0 or 1).

3. The liquid crystal composition according to claim 1, further comprising a third component that is at least one compound selected from compounds represented by General Formulae (N-1), (N-2), and (N-3)

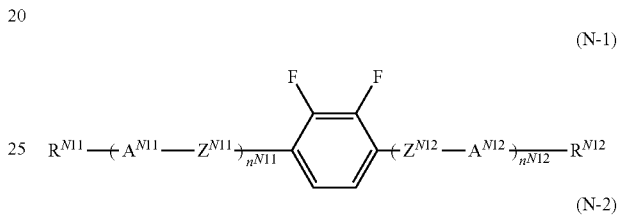
(N-1)

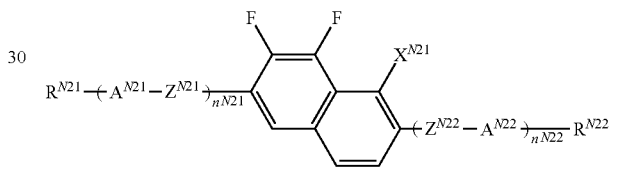
(N-2)

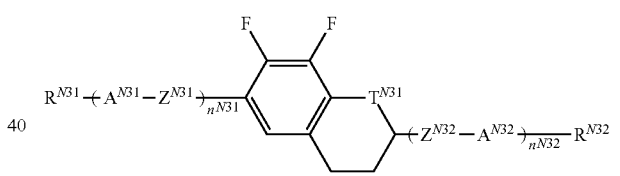
(N-3)

(where $R^{N11}$, $R^{N12}$, $R^{N21}$, $R^{N22}$, $R^{N31}$, and $R^{N32}$ each independently represent an alkyl group having 1 to 8 carbon atoms; in the alkyl group, one —CH$_2$— or two or more —CH$_2$—'s not adjoining each other are each independently optionally substituted with —CH═CH—, —C≡C—, —O—, —CO—, —COO—, or —OCO—;
$A^{N11}$, $A^{N12}$, $A^{N21}$, $A^{N22}$, $A^{N31}$, and $A^{N32}$ each independently represent a group selected from the group consisting of
(a) a 1,4-cyclohexylene group (in which one —CH$_2$— or two or more —CH$_2$—'s not adjoining each other are each optionally substituted with —O—),
(b) a 1,4-phenylene group (in which one —CH═ or two or more —CH═'s not adjoining each other are each optionally substituted with —N═), and
(c) (c) a naphthalene-2,6-diyl group, a 1,2,3,4-tetrahydronaphthalene-2,6-diyl group, or a decahydronaphthalene-2,6-diyl group (in the naphthalene-2,6-diyl group or the 1,2,3,4-tetrahydronaphthalene-2,6-diyl group, one —CH═ or two or more —CH═'s not adjoining each other are each optionally substituted with —N═);
the groups (a) to (c) are each independently optionally substituted with a cyano group, a fluorine atom, or a chlorine atom;

$Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

$X^{N21}$ represents a hydrogen atom or a fluorine atom;

$T^{N31}$ represents —CH$_2$— or an oxygen atom;

$n^{N11}$, $n^{N12}$, $n^{N21}$, $n^{N22}$, $n^{N31}$, and $n^{N32}$ each independently represent an integer from 0 to 3; $n^{N11}+n^{N12}$, $n^{N21}+n^{N22}$, and $n^{N31}+n^{N32}$ are each independently 1, 2, or 3; in the case where $A^{N11}$ to $A^{N32}$ and $Z^{N11}$ to $Z^{N32}$ are multiple, the corresponding ones of them may be the same as or different from each other).

4. The liquid crystal composition according to claim 1, further comprising at least one polymerizable compound.

5. The liquid crystal composition according to claim 4, wherein at least one polymerizable compound represented by General Formula (X) is used as the polymerizable compound

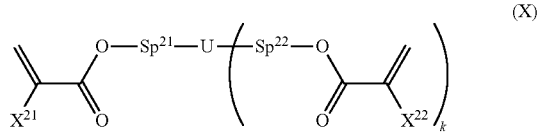

(X)

(where $X^{21}$ and $X^{22}$ each independently represent a hydrogen atom or a methyl group; $Sp^{21}$ and $Sp^{22}$ each independently represent a single bond, an alkylene group having 1 to 8 carbon atoms, or —Y—(CH$_2$)$_s$— (where s represents an integer from 2 to 7; Y represents O, OCOO, or COO; and Y is bonded to the aromatic ring of U)); U represents a linear or branched polyvalent alkylene group having 2 to 20 carbon atoms, a linear or branched polyvalent alkenylene group having 3 to 20 carbon atoms, or a polyvalent cyclic substituent having 5 to 30 carbon atoms; the alkylene group of the polyvalent alkylene group or the alkenylene group of the polyvalent alkenylene group is optionally substituted with —O—, —CO—, —CF$_2$—, an alkyl group having 5 to 20 carbon atoms (in which the alkylene group is optionally substituted with an oxygen atom provided that oxygen atoms do not adjoin each other), or a cyclic substituent provided that oxygen atoms do not adjoin each other; and k represents an integer from 1 to 5).

6. A liquid crystal display device comprising the liquid crystal composition according to claim 1.

7. An active-matrix liquid crystal display device comprising the liquid crystal composition according to claim 1.

8. A liquid crystal display device of any of VA, PSA, PSVA, IPS, and FFS modes, the device comprising the liquid crystal composition according to claim 1.

* * * * *